(12) United States Patent
Thorne et al.

(10) Patent No.: US 9,505,423 B2
(45) Date of Patent: *Nov. 29, 2016

(54) LIGHTWEIGHT COLLAPSIBLE STROLLER

(71) Applicant: Thorley Industries LLC, Pittsburgh, PA (US)

(72) Inventors: Henry F. Thorne, Sewickley Heights, PA (US); Lou Conley, Sewickley, PA (US); Benjamin Hannigan, Pittsburgh, PA (US); Donald Lee, Pittsburgh, PA (US)

(73) Assignee: Thorley Industries LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/660,342

(22) Filed: Mar. 17, 2015

(65) Prior Publication Data

US 2015/0239485 A1    Aug. 27, 2015

Related U.S. Application Data

(63) Continuation-in-part of application No. 14/581,094, filed on Dec. 23, 2014, which is a continuation of application No. 13/672,038, filed on Nov. 8, 2012, now Pat. No. 8,944,457.

(60) Provisional application No. 61/557,694, filed on Nov. 9, 2011.

(51) Int. Cl.
*B62B 7/08* (2006.01)
*B62B 9/10* (2006.01)
*B62B 7/06* (2006.01)
*B62B 9/00* (2006.01)

(52) U.S. Cl.
CPC . *B62B 7/08* (2013.01); *B62B 7/06* (2013.01); *B62B 7/066* (2013.01); *B62B 7/068* (2013.01); *B62B 7/086* (2013.01); *B62B 9/00* (2013.01); *B62B 9/10* (2013.01); *B62B 2205/003* (2013.01); *B62B 2205/02* (2013.01)

(58) Field of Classification Search
None
See application file for complete search history.

(56) References Cited

U.S. PATENT DOCUMENTS

| | | | |
|---|---|---|---|
| 4,736,959 | A | 4/1988 | Van Steenburg |
| 4,762,256 | A | 8/1988 | Whitaker |
| 4,872,692 | A | 10/1989 | Steenburg |
| 4,915,401 | A | 4/1990 | Severson et al. |

(Continued)

FOREIGN PATENT DOCUMENTS

| | | |
|---|---|---|
| CN | 102205848 A | 10/2011 |
| EP | 0577496 A1 | 1/1994 |

(Continued)

*Primary Examiner* — John Walters
*Assistant Examiner* — Hilary L. Johns
(74) *Attorney, Agent, or Firm* — The Webb Law Firm

(57) ABSTRACT

A stroller is provided herein. The stroller includes a frame configured to transition between an open position and a closed position and having a right side and a left side. The stroller also includes a linkage having one or more substantially rigid members connected between the right side and the left side. Each of the substantially rigid members has a right end and a left end. The right end and the left end respectively are slidably connected to a portion of the right side and the left side of the frame. The stroller can include at least one stand structure connected to the frame and configured to maintain the stroller in a substantially upright orientation when the stroller is in the closed position.

20 Claims, 26 Drawing Sheets

(56) References Cited

U.S. PATENT DOCUMENTS

| | | |
|---|---|---|
| 5,622,376 A | 4/1997 | Shamie |
| 5,765,665 A | 6/1998 | Cheng et al. |
| 6,113,128 A | 9/2000 | Watkins |
| 6,598,712 B1 | 7/2003 | Sun |
| 6,767,028 B2 | 7/2004 | Britton et al. |
| 7,017,938 B2 | 3/2006 | Kinzel |
| 7,419,181 B2 | 9/2008 | Kassai et al. |
| D580,307 S | 11/2008 | Kassai et al. |
| D615,004 S | 5/2010 | Ohnishi |
| 7,832,744 B2 | 11/2010 | Chen et al. |
| D635,491 S | 4/2011 | Ohnishi |
| 8,066,300 B2 | 11/2011 | Ohnishi |
| 8,210,562 B2 | 7/2012 | Ohnishi |
| 8,740,243 B2 | 6/2014 | Li |
| 2002/0041083 A1 | 4/2002 | Britton et al. |
| 2002/0050700 A1 | 5/2002 | Stohr et al. |
| 2005/0168006 A1 | 8/2005 | Darland |
| 2006/0066076 A1 | 3/2006 | Church |
| 2006/0214397 A1 | 9/2006 | Dotsey et al. |
| 2009/0008908 A1 | 1/2009 | Kassai et al. |
| 2009/0008909 A1 | 1/2009 | Kassai et al. |
| 2009/0033065 A1 | 2/2009 | Kassai et al. |
| 2009/0102149 A1 | 4/2009 | Ohnishi |
| 2009/0102163 A1 | 4/2009 | Ohnishi |
| 2009/0121454 A1 | 5/2009 | Tomasi et al. |
| 2010/0209179 A1 | 8/2010 | Wu |
| 2010/0264628 A1 | 10/2010 | Ohnishi |
| 2011/0175305 A1 | 7/2011 | Chen et al. |
| 2011/0233902 A1 | 9/2011 | Ohnishi |
| 2012/0049485 A1 | 3/2012 | Lin |
| 2014/0028003 A1 | 1/2014 | Saville et al. |

FOREIGN PATENT DOCUMENTS

| | | |
|---|---|---|
| EP | 1967439 A2 | 9/2008 |
| EP | 2332807 A2 | 6/2011 |

LIGHTWEIGHT COLLAPSIBLE STROLLER

CROSS REFERENCE TO RELATED APPLICATIONS

This application is a continuation-in-part of U.S. patent application Ser. No. 14/581,094 filed on Dec. 23, 2014, which is a continuation of U.S. patent application Ser. No. 13/672,038 filed Nov. 8, 2012, which issued as U.S. Pat. No. 8,944,457 on Feb. 3, 2015, and which claims priority to U.S. Provisional Patent Application No. 61/557,694 filed on Nov. 9, 2011, the disclosures of each of which are hereby incorporated by reference in their entireties.

BACKGROUND OF THE INVENTION

1. Field of the Invention

The present invention relates generally to strollers, and more particularly, to lightweight baby strollers adapted for use during active movement such as jogging.

2. Description of Related Art

Baby strollers, also referred to as baby carriages, baby buggies, or prams, have been used to hold and transport babies and young children for many years. Early baby strollers had parts that were fixedly secured to one another such that they did not fold for compactness. Baby strollers have been designed to have some parts which are movable relative to one another to allow movement of some parts of the stroller to achieve a more compact configuration when not in use. However, current strollers do not allow for movement or folding to compact configuration as desired, and are cumbersome and sometimes difficult to move between their collapsed (closed) positions and their operative (open) positions, particularly when attending to a baby or child. More recently, strollers that automatically transition between their collapsed and operative positions, such as a stroller that does so upon the push of a button via motorized movement, have recently been created.

In addition to designing baby strollers that are easily foldable to compact and transportable configurations, efforts have been directed to reducing the total weight of baby strollers so that the effort required to push the stroller is effectively reduced. Lightweight strollers are especially desirable for use during physically demanding activities such as pushing the stroller while jogging. In addition, lightweight strollers are clearly easier to transport (e.g., loading into cars, carrying up stairs) particularly for smaller users. Efforts to reduce the overall weight of a baby stroller include replacing metal structural materials with lightweight structural materials such as hard plastics. In addition, new stroller designs have been proposed which use fewer structural members, reduce the length and width of frame materials, or which replace structural framing materials with tubular hollow framing materials. However, lightweight strollers generally lack the improved functionality, structural stability, and stylish design which users expect from larger heavier models.

Therefore, a need exists for a lightweight jogging stroller formed substantially from lightweight materials such as hard plastics. The stroller should effectively achieve the functional advantages of heavier strollers (e.g., automatic folding, full suspension, expansive onboard storage, electric safety features such as day time running lights, safety sensors, etc.). The stroller should also exhibit good structural stability and should not bend or pivot when pushed on by a user. The stability of the device should inspire confidence in users. A lightweight stroller exhibiting at least these features is described herein.

SUMMARY OF INVENTION

The present invention provides a lightweight stroller which can be quickly and easily transitioned between a closed position and an open position. The stroller includes a right frame and a left frame. Each frame has a front support rotatably connected to a rear support at a frame joint. The front support of each frame is a telescoping tube assembly which includes: an outer tube extending from an end of the front support to the frame joint of the support; an inner tube assembly partially inserted within the outer tube and protruding from the outer tube; and, a slot extending longitudinally along at least a portion of the outer tube. The stroller further includes a linkage comprising at least two substantially rigid members connected between the right frame and the left frame, the rigid members being connected to the front supports at a right slideable joint and a left slidable joint. The joints are received within the slot of the outer tube. A drive mechanism coupled to the right or left frame is also provided. The front support and the rear support of the right frame and the left frame are movable from an open position to a closed position by the drive mechanism. In addition, transitioning the stroller from the open position to the closed position causes the slideable joints to slide downward along the slots of the outer tube.

In certain configurations, the inner tube assembly of the stroller includes: an inner tube which is inserted partially within the outer tube and protrudes from the outer tube at the frame joint; a tube stiffening member inserted within the outer tube and disposed below the slideable joint when the front support is in the open position, the tube stiffener having a slot which corresponds with the slot of the outer tube; and, an extension member extending between an end of the inner tube which is inserted in the outer tube and the slidable joint. Optionally, the extension member is configured to push the slideable joint longitudinally through the slot of the tube stiffener and the slot of the outer tube when the stroller transitions from the open position to the closed position, and the extension member is received within the slot of the tube stiffener. The tube stiffener may further include an unbroken sidewall enclosing a hollow portion extending longitudinally through the tube stiffener.

In certain further configurations of the stroller, the drive mechanism includes a cable drive, a spool rotated by the cable drive, and a cable received by the spool, wherein the cable is coupled to the inner tube. The cable drive may be in direct rotational connection with the spool. Preferably, the cable is formed of a synthetic polymer, such as ultra high molecular weight polyethylene. The stroller may also include a biasing member connected in series with the cable for removing slack from the cable while the drive mechanism is engaged. The drive mechanism may be powered by a battery, an electrical generator, a spring, compressed air, or any combination thereof.

In certain configurations, the linkage of the stroller is a scissor linkage configured such that the rigid members are connected between the front support of one frame and the rear support of the other frame and, wherein the rigid members of the scissor linkage are connected at a rotatable center joint such that as the stroller transitions from the open position to the closed position, the rigid members rotate about the center joint bringing ends of the rigid members closer together. Optionally, the stroller also includes an activation button for engaging the drive mechanism. The activation button may be a dead man switch. The stroller may further include a screen for presenting information to a user, wherein the information includes air temperature, battery power, time, speed, or distance traveled.

In certain configurations, the stroller further includes a parallelogram linkage connected between the right frame and the left frame, the parallelogram linkage comprising: a foldable upper horizontal member; a foldable lower horizontal member approximately parallel to the upper horizontal member; and, a latch, which when engaged, maintains the members in an extended position and when disengaged permits the members to fold. In addition, the stroller may further include a parallelogram drive mechanism coupled to the parallelogram linkage for transitioning the horizontal members of the parallelogram linkage from the extended position to the folded position.

In certain configurations, a storage assembly may be affixed to the stroller. Optionally, the storage assembly includes: a storage bag; at least one cable fixedly attached to the right frame and at least one cable fixedly attached to the left frame; and a flexible joint for connecting the cables to the bag. The storage assembly is configured such that the bag remains in an expanded position when the frame moves from the open position to the closed position.

In accordance with a further aspect of the present invention, a stroller is provided which includes: a right frame and a left frame, each frame comprising a front support rotatably connected to a rear support at a frame joint; a parallelogram linkage connected between the right frame and the left frame comprising a foldable upper horizontal member, a foldable lower horizontal member approximately parallel to the upper horizontal member, and, a latch, which when engaged, maintains the members in an extended position and when disengaged permits the members to fold; and, a drive mechanism coupled to the frame or parallelogram linkage. The invented stroller provides that the front support and the rear support of the right frame and the left frame are movable from an open position to a closed position, the horizontal members of the parallelogram linkage transition from the extended position to the folded position concurrently with the transition of the frame from the open position to the closed position, and movement of the frames or transition of the parallelogram linkage is effectuated by the drive mechanism.

In certain configurations, the drive mechanism includes a drive, a gear engaged with and driven by the drive, and a locking member connected to the gear. Optionally, the locking member engages the upper or lower horizontal member of the parallelogram linkage for transitioning the parallelogram linkage from the extended position to the folded position. The drive mechanism includes a manual clutch configured to selectively engage and disengage the drive from the gear. Furthermore, the drive may be configured such that as the drive is being engaged with the gear, the drive applies a light preload pressure to align the drive and gear before a full force of the drive is applied to the gear.

In accordance with a further aspect of the present invention, a stroller is provided which includes a frame moveable from an open position to a closed position and a drive mechanism coupled to a portion of the frame. The drive mechanism includes: a cable drive; a spool rotated by and in direct rotational connection with the cable drive; a cable received by the spool; and, a biasing member connected in series with the cable for removing slack from the cable when the drive mechanism is engaged.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
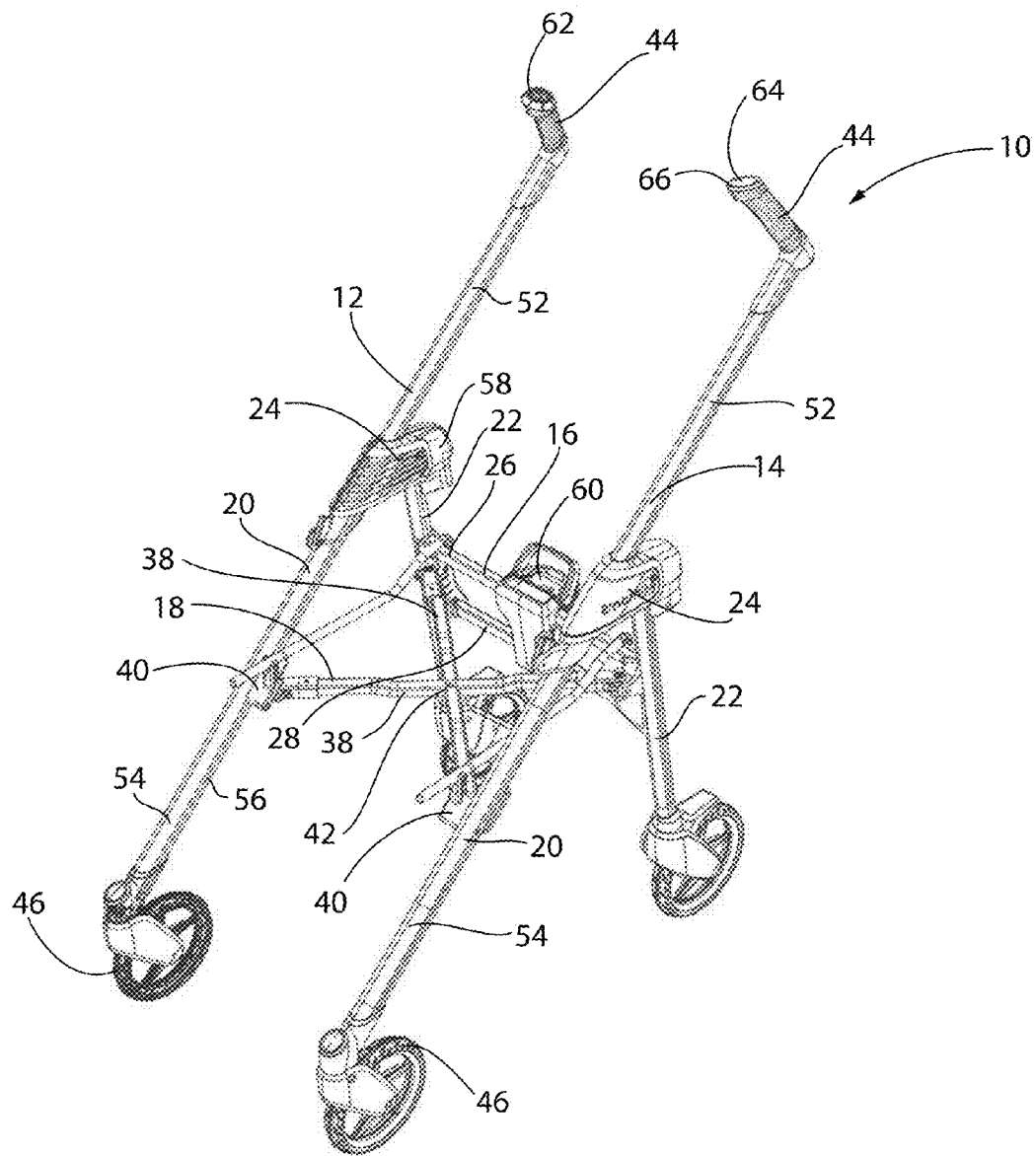
FIG. 1 is a forwardly directed perspective view of a collapsible stroller, according to an embodiment of the present invention, shown in its open position.
Figure 2:
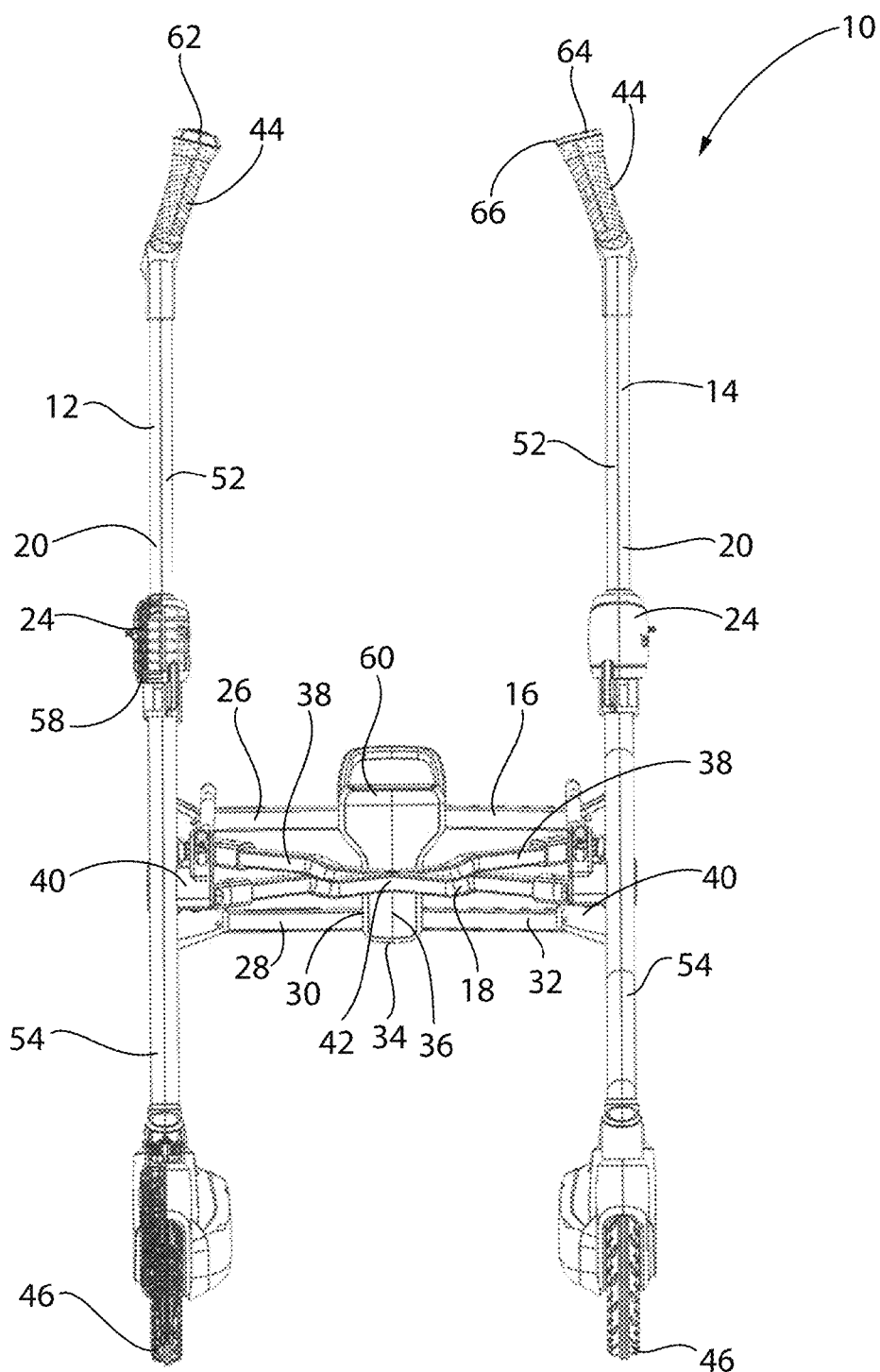
FIG. 2 is a front view of the stroller of FIG. 1 shown in its open position.
Figure 3:
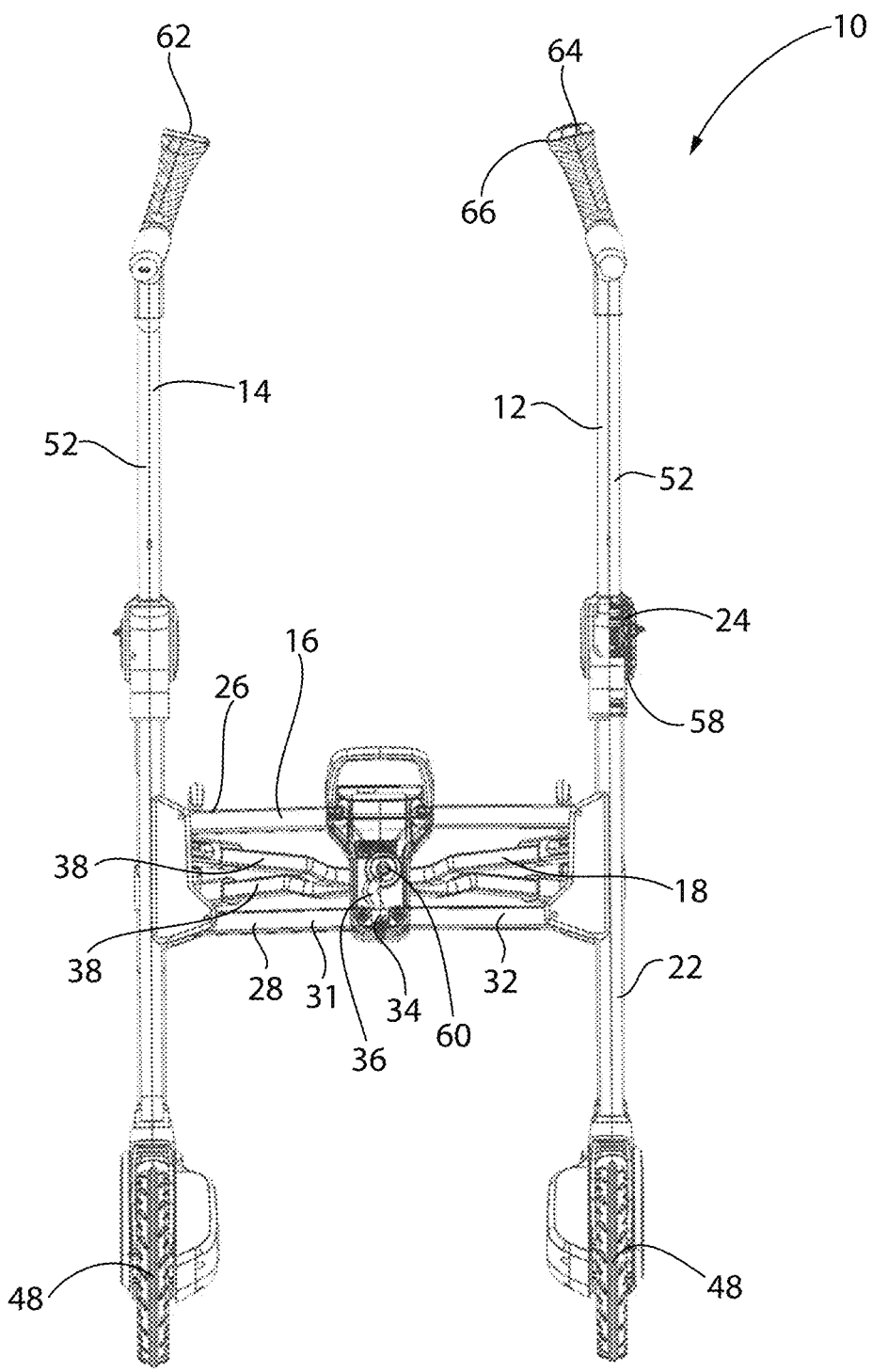
FIG. 3 is a rear view of the stroller of FIG. 1 shown in its open position.
Figure 4:
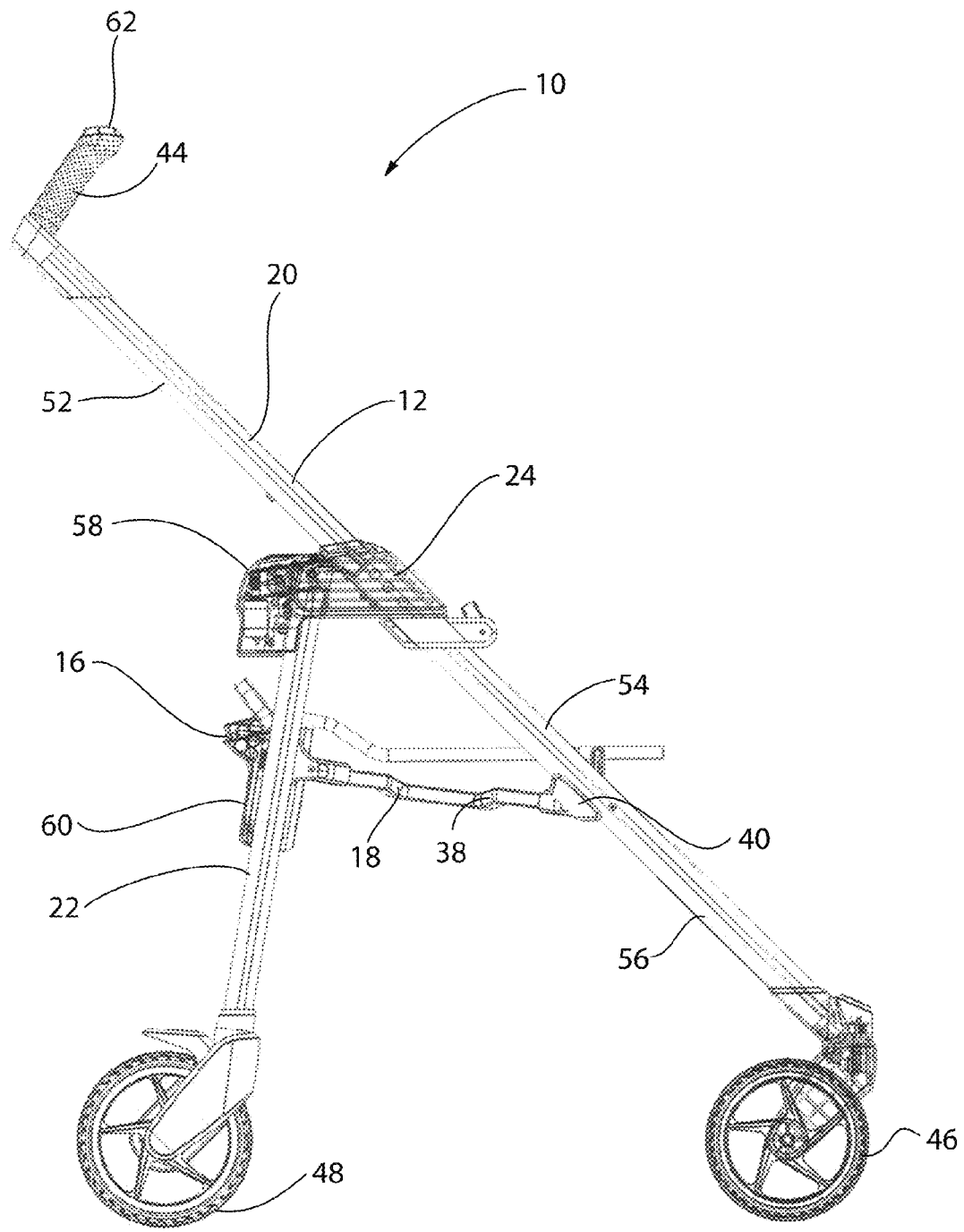
FIG. 4 is a side view of the stroller of FIG. 1 shown in its open position.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

With reference to FIGS. 1-9, a stroller 10 includes a right frame 12, a left frame 14, and a linkage (e.g., a parallelogram linkage 16 and/or a scissor linkage 18) connected therebetween. The frames 12, 14 and linkage 16, 18 may be formed from any suitable material strong enough to support the stroller 10 and occupant including hard plastics and metal. In certain embodiments, the frames 12, 14 are formed from hollow tubular members to reduce the weight of the stroller 10.

Figure 5:
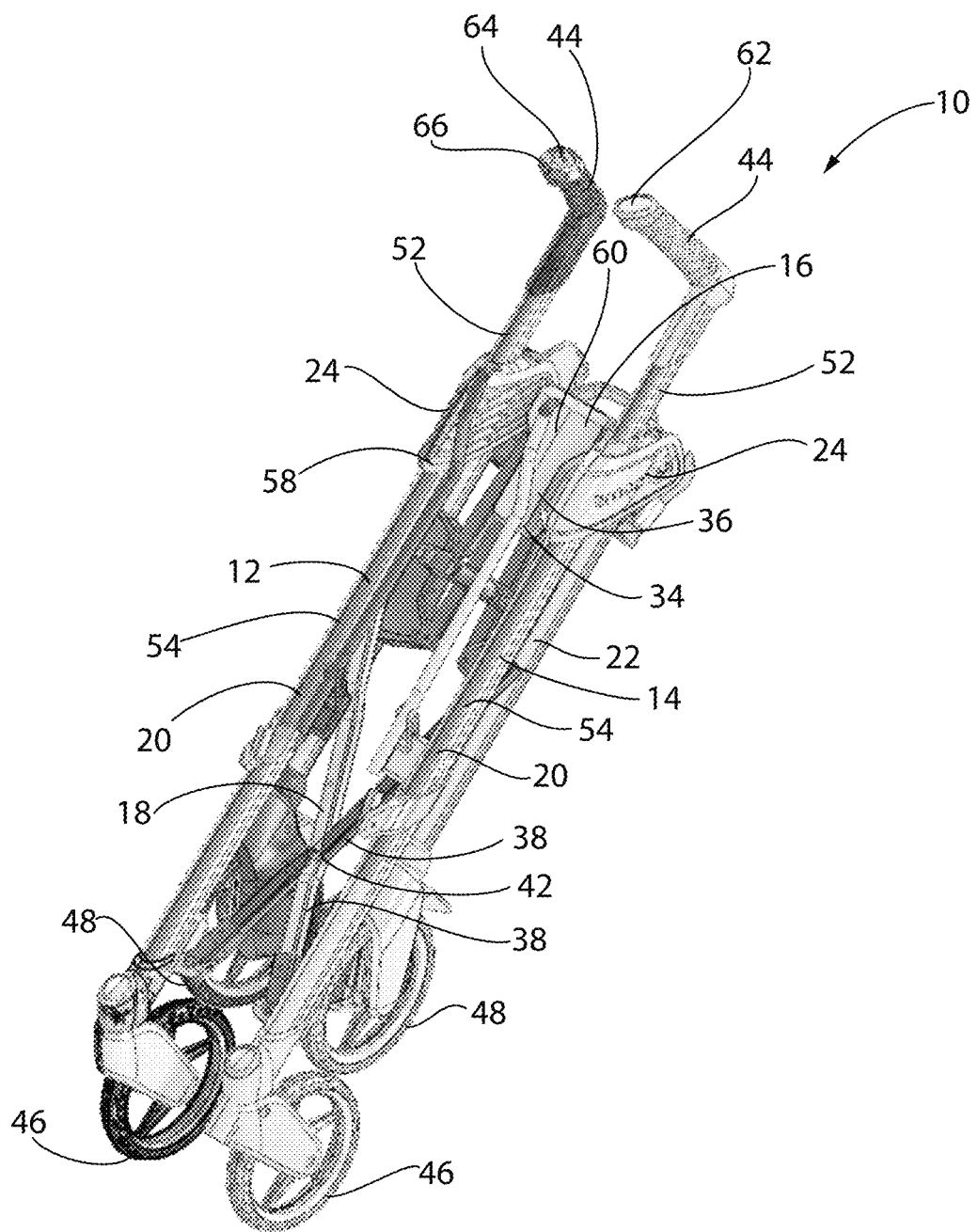
FIG. 5 is a perspective view of the stroller of FIG. 1 shown in its fully closed position.
Figure 6:
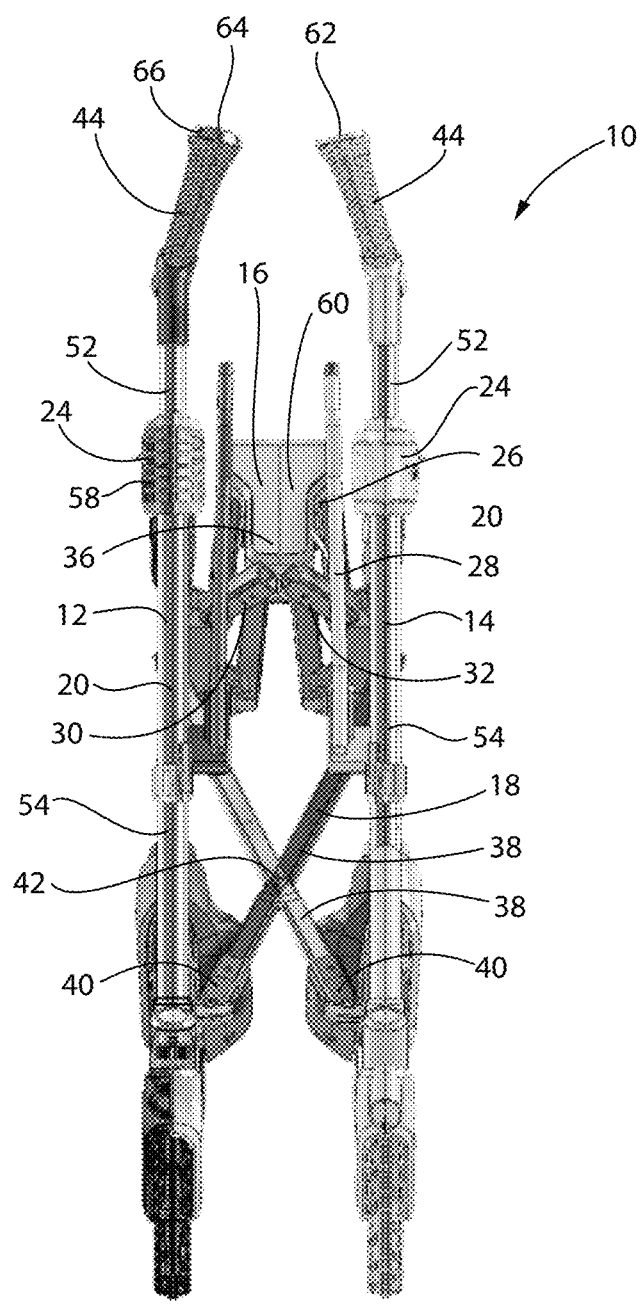
FIG. 6 is a front view of the stroller of FIG. 1 shown in its fully closed position.
Figure 7:
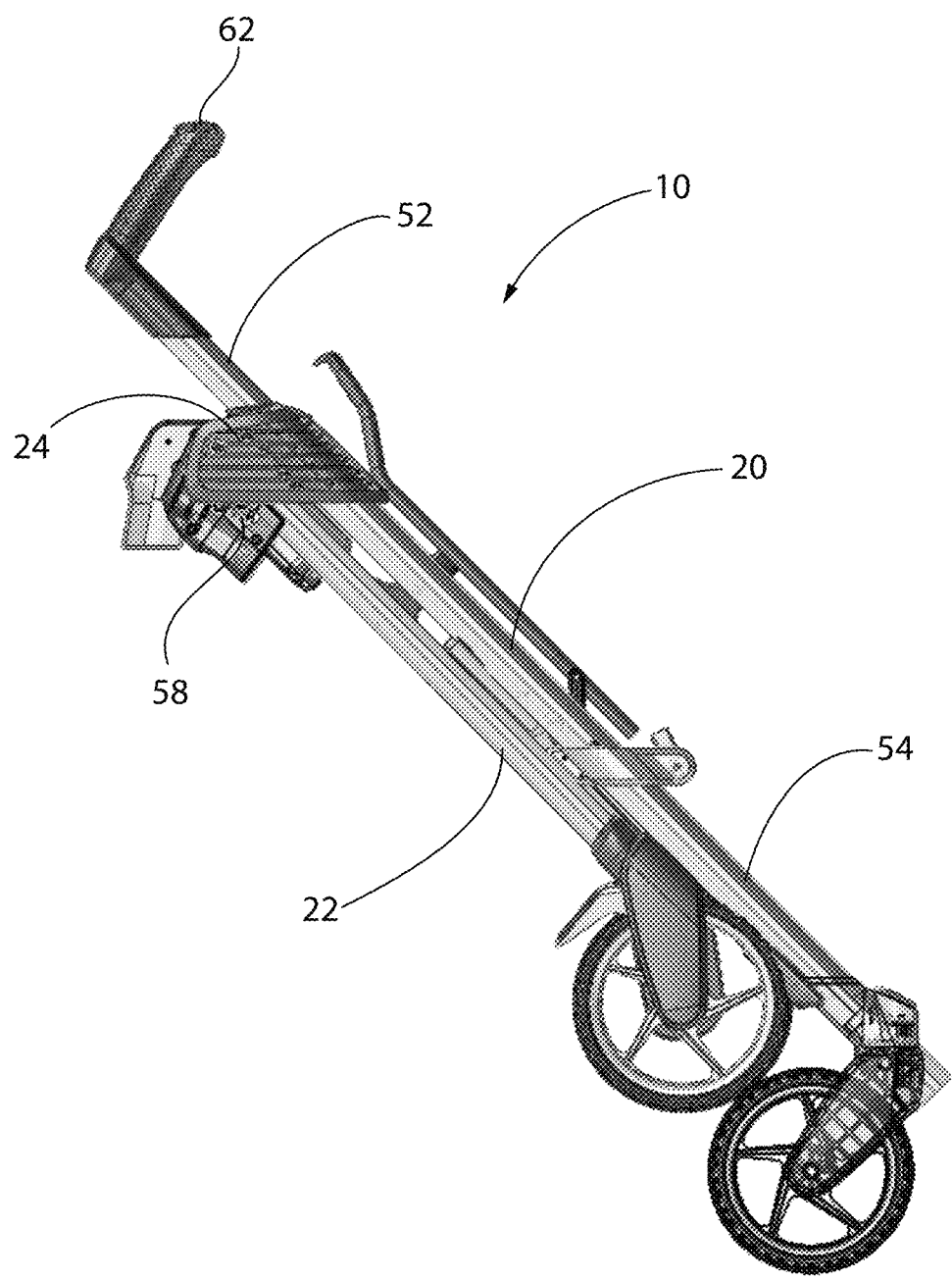
FIG. 7 is a side view of the stroller of FIG. 1 shown in its fully closed position.

The right frame 12 and left frame 14 are substantially identical in appearance and construction. The right frame 12 is described hereinafter. However, it is understood that the left frame 14 is constructed to mirror the right frame 12. The right frame 12 includes a front support 20 rotatably connected to a rear support 22 at a frame joint 24. The front support 20 and the rear support 22 are moveable from an open position to a closed position. In the open position, the front support 20 is positioned at approximately a 45 degree angle relative to the rear support 22. In the closed position, the front support 20 and rear support 22 are approximately parallel. However, these angles are not intended to be limiting and may vary within the scope of the present invention. In one exemplary embodiment, the stroller in the open position is depicted in FIGS. 1-4. The stroller in the closed position is depicted in FIGS. 5-7.

The linkage connecting the right frame 12 to the left frame 14 may be any suitable structural member including, but not limited to, the parallelogram linkage 16 and/or the scissor linkage 18. In one non-limiting embodiment, a parallelogram linkage 16 is formed of a foldable upper horizontal member 26 and a foldable lower horizontal member 28, wherein the members 26, 28 are connected between the rear supports 22 of the right frame 12 and the left frame 14. The horizontal members 26, 28 each include a first section 30 and a second section 32 connected by a folding joint 34. The parallelogram linkage 16 further includes a latch 36 engaged with the folding joint 34 which, when locked, maintains the horizontal members 26, 28 in an extended position and which, when released, permits the folding joint 34 to transition to the folded position. The parallelogram linkage 16 is configured to transition from the extended position to the folded position concurrently with the transition of the frames 12, 14 from the open position to the closed position. A parallelogram linkage 16 containing two horizontal members 26, 28 is found to offer advantages compared to other known configurations for connecting frame structures of a stroller. Specifically, since the members 26, 28 are relatively small and since there is a large space between the horizontal members 26, 28 and the ground, a user will not kick or bump the linkage 16 while pushing the stroller 10. In addition, since the parallelogram linkage 16 takes up only a small portion of the rear supports 22, there is sufficient space to hang storage devices such as bags or panniers off of the rear supports 22 without obstructing the folding motion of the linkage 16. Finally, a linkage 16 comprising two parallel horizontal members 26, 28 is generally believed to be visually appealing and less cluttered than alternative linkage designs which include more parts and fewer straight lines.

In certain embodiments, the stroller 10 further includes the scissor linkage 18. The scissor linkage 18 includes two substantially rigid members 38 connected between a rear support 22 and a front support 20 of the opposing frame. The rigid members 38 are connected to the front support 20 at a slideable joint 40 capable of sliding upward and downward along a lower portion of the front support 20. The slideable joints 40 are configured to slide downward along the front supports 20 concurrently with the transition of the frames 12, 14 from the open position to the closed position. In certain embodiments, the rigid members 38 are connected together at a rotatable center joint 42. The members 38 are rotated together around the center joint 42 as the frames 12, 14 transition from the open position to the closed position.

The stroller 10 may further include additional elements extending from the frames to facilitate pushing the stroller. For example, in certain embodiments, handles 44 extend from the top of the front supports 20 for pushing the stroller.

Additionally, the stroller 10 includes front 46 and rear wheels 48 attached to the lower end of the front support 20 and rear supports 22, respectively. In one embodiment, the wheels 46, 48 are connected to the frames 12, 14 through a suspension system for absorbing bumps or depressions in the ground to make pushing the stroller 10 easier and to improve ride comfort for the child occupant. The suspension system may be a spring based suspension system or any other suitable system as is known in the art.

The stroller 10 may further include a foot stand (not shown) which may further assist in keeping the stroller upright in the folded (e.g., closed) position. The foot stand may extend between the lower portions of the front supports 20 and may also house additional electronic features such as day time running lights (not shown).

Figure 8:
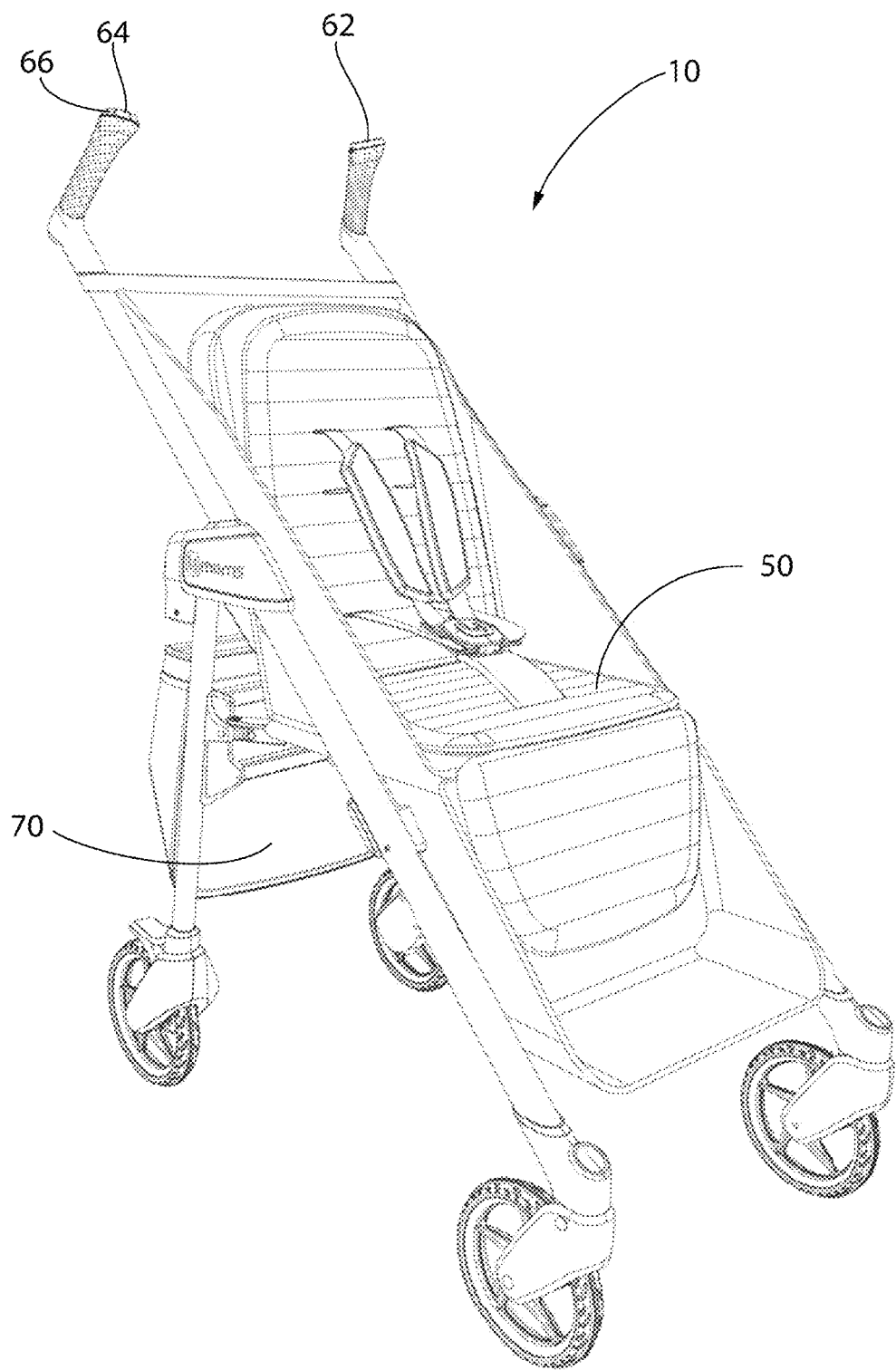
FIG. 8 is a forwardly directed perspective view of the stroller of FIG. 1 having a seat and a storage bag affixed thereto.

With reference to FIG. 8, in certain embodiments, the lower portion of the front supports 20 may provide an attachment mechanism for a child support area including a child seat 50. The child support area may be anchored to the front supports 20 at a position between the slideable joint 40 and frame joint 24, such that movement of the slideable joint 40 is not obstructed by seat 50. A cover or umbrella (not shown) may also be connected to the frames 12, 14, for protecting the child from exposure to the sun. In certain embodiments, the cover (not shown) is connected to the upper portion of the front supports 20, at a point above the frame joint 24.

Figure 9:
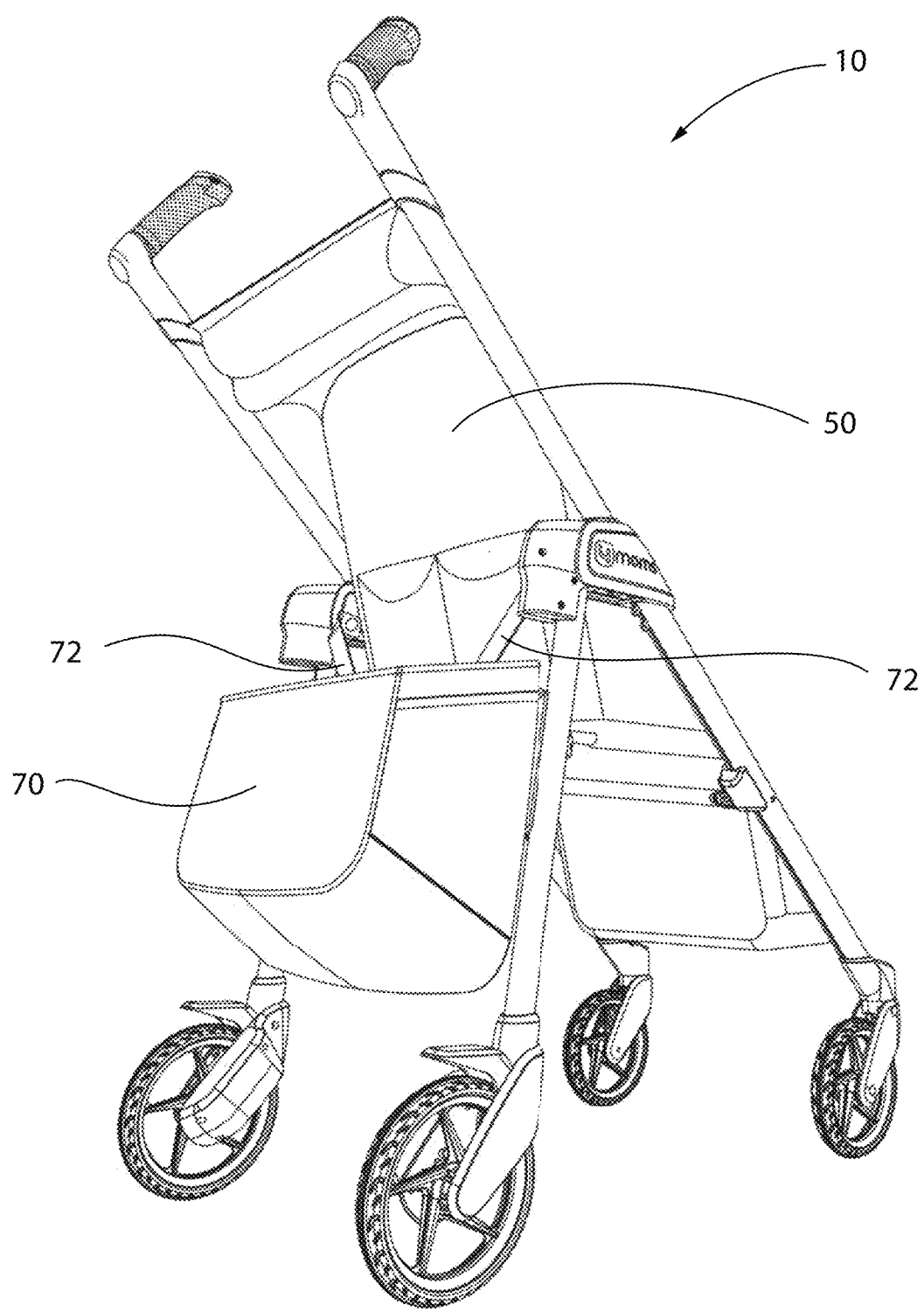
FIG. 9 is a rearwardly directed perspective view of the stroller of FIG. 1 having a seat and a storage bag attached thereto.

With reference to FIGS. 8 and 9, a storage bag 70 may be attached to the rear supports 22 of the stroller 10. The storage bag can be used to carry supplies for the child occupant or for the user, such as food items, clothing, diapers, toys, etc. With most folding strollers, storage bags are generally folded up in connection with the folding of the stroller frame. It was important to remove all items from the bag before folding the stroller so that nothing would be damaged. Alternatively, the bag could be removed before folding the stroller. When manually closing a stroller, a user would typically notice if objects were still in the bag and could remove the objects or bag from the stroller before continuing to fold the stroller. A unique problem with power folding strollers, such as the stroller 10 of the present invention, is that the user may initiate automatic folding of the stroller 10 without realizing that objects are contained within the bag. Since the folding process is automatic, the bag may collapse breaking objects contained therein, before the user realizes that the bag was loaded. Therefore, in a preferred and non-limiting embodiment of the present invention, the storage bag 70 is configured to remain in an unfolded (e.g., expanded) position while the stroller 10 transitions between the open and closed positions. To maintain the bag 70 in the expanded position, in one embodiment, the bag 70 further includes cables 72 fixedly connected to the frame 12, 14. For example, the cables 72 may be anchored to the frame joints 24. The cables 72 may be any sort of webbing, fabric, or material which is sufficiently strong to support the weight of the bag 70 and objects contained therein. The cables 72 are coupled to the bag 70 at a flexible joint. The cables 72 and flexible joint are configured such that, as shown in FIG. 9, when the stroller 10 is in the open position, the cables 72 are oriented at approximately a 45 degree angle relative to the ground. As the stroller 10 transitions to the closed position, the fixed ends of the cables 72 are brought together such that, when the stroller 10 is in the closed position, the cables 72 are substantially parallel. In this way, the bag 70 does not collapse as the stroller 10 transitions between the open and closed positions.

With continued reference to FIGS. 1-9, in a non-limiting embodiment, the front supports 20 of the stroller 10 are formed with a telescoping tube-in-tube design to reduce weight and improve overall appearance. In certain other embodiments of the stroller 10, rather than a telescoping tube-in-tube design, the front support 20 could be constructed as a non-coaxial tube with an external telescoping guide, as is known in the art.

In a tube-in-tube configuration, the front support 20 includes an inner tube 52 and a hollow outer tube 54. The outer tube 54 extends from an end of the front support 20 to the frame joint 24. In the embodiment of the stroller 10, depicted in FIGS. 1-9, the outer tube 54 is positioned at the lower portion of the front support 20, and the inner tube 52 is positioned at the upper portion of the front support 20. However, it is understood that this configuration may be reversed, such that the outer tube 54 is positioned at the upper portion of the stroller 10. The outer tube 54 includes a longitudinal slot extending, at least partially, along the length of the outer tube 54. The slideable joint 40 of the scissor linkage 18 is configured to be received within the slot 56.

Generally, a tube 54 having a longitudinal slot 56 would lack rigidity unless additional stiffening structures are disposed within the tube to contribute additional structural stability. Accordingly, if no additional structural members were included in the outer tube 54, when the stroller 10 is pushed with substantial force, the front supports 20 may bend or flex causing the stroller 10 to feel unstable or poorly made. However, inserting additional structural supports into the outer tube 54 is difficult because the inner tube 52 is configured to insert farther within the outer tube 54 as the stroller 10 transitions to the closed position. Thus, there is limited space in the outer tube 54 for including additional structural supports.

Figure 10:
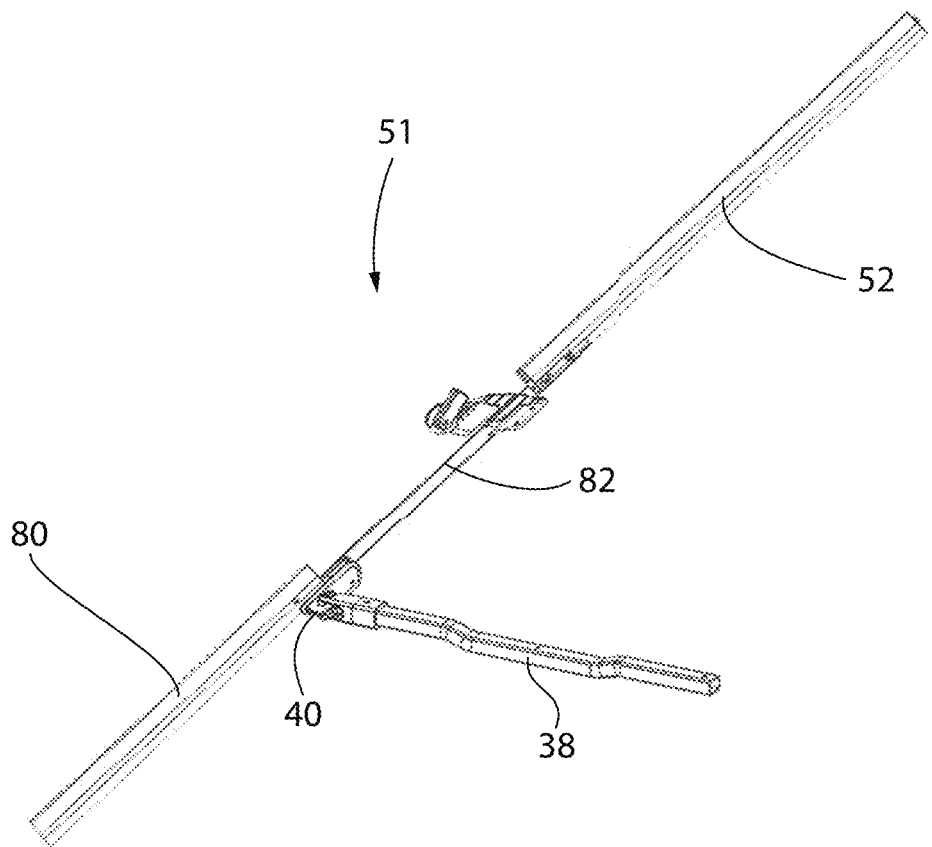
FIG. 10 is a perspective view of the inner tube assembly of the front support of the stroller of FIG. 1.
Figure 11:
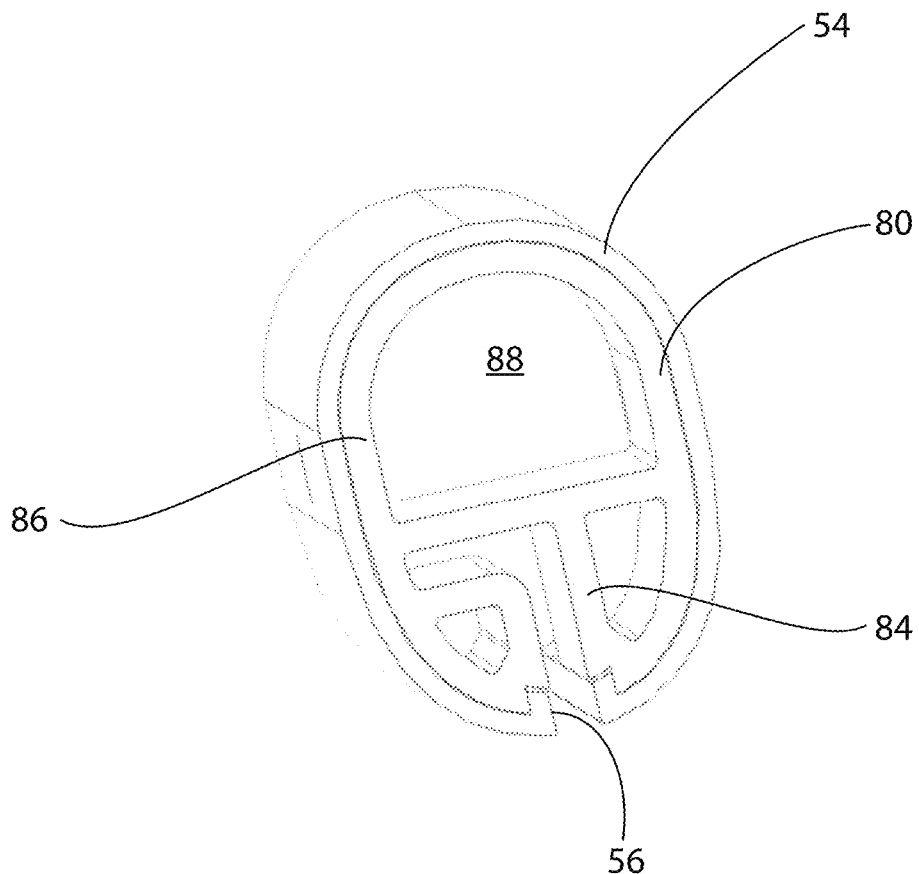
FIG. 11 is a perspective cross-sectional view of the angled member of stroller of FIG. 1 with an inner tube nested within an outer tube.
Figure 12:
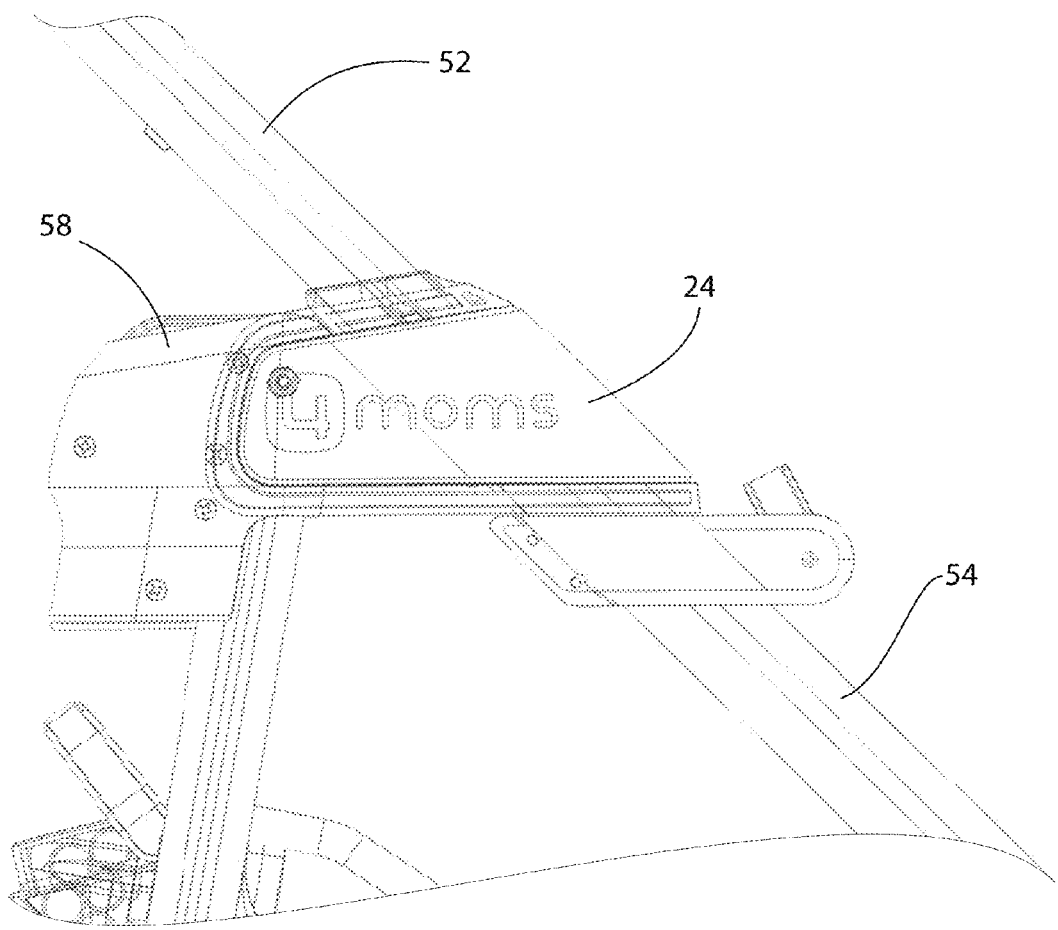
FIG. 12 is a magnified side view of the stroller of FIG. 1 focusing on the drive mechanism for the frame.

With reference to FIGS. 10 and 11, to counteract this lack of rigidity, the stroller 10 includes an inner tube assembly 51 consisting of the inner tube 52 which is inserted partially within the outer tube 54, a tube stiffener 80, and an extension member 82 extending between an end of the inner tube 52 and the tube stiffener 80. The inner tube 52 is inserted within the outer tube 54 approximately 5 to 6 inches when the stroller is in the open position and is configured to insert farther into the outer tube 54 as the stroller transitions to the closed position. The tube stiffener 80 is a substantially hollow member disposed within the outer tube 54 below the slideable joint 40 when the front support 20 is in the open position. The tube stiffener 80 includes a slot 84 which corresponds with the slot 56 of the outer tube 54. The tube stiffener 80 provides rigidity for the lower portion of the outer tube 54. When the stroller is in the open position, the extension member 82 extends from an end of the inner tube 52 to the slideable joint 40. As the stroller 10 transitions from the open position to the closed position, the extension member 82 pushes on the slideable joint 40 advancing the joint 40 downward through the slot 56 of the outer tube 54 and the corresponding slot 84 of the tube stiffener 80. As the extension member 82 is advanced downward, the extension member 82 is also received within the slot of the tube stiffener 80.

As shown in FIG. 11, the tube stiffener 80 may further include a portion having an unbroken sidewall 86 defining an entirely enclosed portion 88. The slot 84 is separate from the enclosed portion 88. As described above, an unbroken tubular member has increased rigidity compared to a member having a slot. By including the unbroken enclosed portion 88, the rigidity of the tube stiffener is enhanced. Alternatively, the tube stiffener 80 could include a cross member extending longitudinally along the hollow interior of the tube. The cross member would contribute rigidity to the tube stiffener 80. However, including a cross member extending along the entire length of the tube stiffener 80 would add additional weight.

In this configuration, it is understood that the outer tube 54 is effectively divided into three segments when the stroller 10 is in the open position. The first segment is the portion of the tube 54 between the front wheels 46 and the slideable joint 40. The tube stiffener 80 is disposed within this segment and contributes additional rigidity to this segment of the outer tube 54. The second segment is the portion of the outer tube 54 from the slideable joint 40 to the inserted end of the inner tube 52. This segment of the outer tube 54 lacks rigidity since the only additional structure in this segment of the outer tube 54 is the extension member 82. However, the rigidity of the other segments of the outer tube 54 has been found to be sufficient to ensure proper function of the stroller 10 even though this middle segment lacks rigidity. The third segment corresponds to the 5 to 6 inches of overlap between the inner tube 52 and the outer tube 54. In this segment, the inner tube 52 provides additional rigidity for the outer tube 54.

Alternatively, the slot 56 of the outer tube 54 could be manufactured to extend only along the portion of the outer tube 54 between the slideable joint 40 and lower end of the outer tube 54 (e.g., the portion of the outer tube 54 which includes the tube stiffener 80). In that way, the rigidity of the second segment of the outer tube 54 would be preserved since it would not include a slot 56. However, machining a slot extending only partially along the length of the outer tube 54 is more expensive than is machining a slot 56 along the entire length of the outer tube 54.

In a non-limiting embodiment of the inner tube assembly 51, the slideable joint 40 includes a key, which functions as a locking structure for the outer tube 54. The key is inserted into the slot 56 of the outer tube 54. The rigid member 38 of the scissor linkage 18 is connected to the key to form the slideable joint 40. In this configuration, the slidable joint 40 is freely rotatable, relative to the key, along both the horizontal and vertical axis. When the stroller 10 is in the open position, the key provides additional rigidity for the outer tube 54, helping to prevent the middle segment of the other tube from flexing or twisting during use. As the stroller 10 transitions to the closed position, the key slides downward along the slot 56 as the rigid members 38 are being rotated together about the center joint 42. Thus, the slideable joint 40 must freely rotate to accommodate both the downward motion of the key and the horizontal rotation of the rigid member 38.

With reference again to FIGS. 1-9, the stroller 10 further includes one or more drive systems (e.g., an electric motor, hydraulic system, or manually operable mechanical system) for transitioning the stroller 10 between the open and closed positions. In one non-limiting embodiment, the stroller includes two driving subsystems, namely, a system for transitioning the frames 12, 14 between the open and closed positions, and a system for latching and folding the parallelogram linkage 16.

Figure 13:
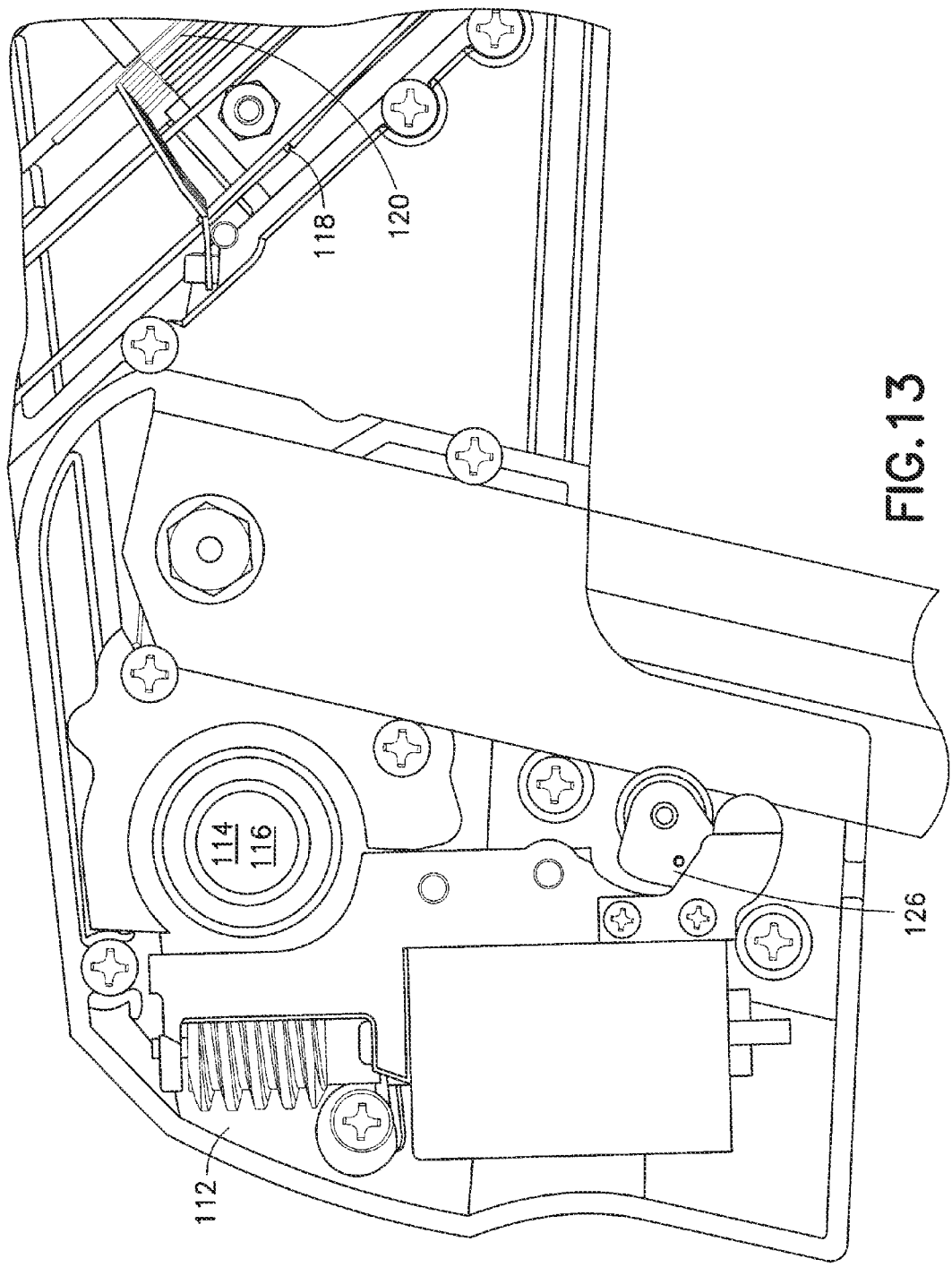
FIG. 13 is a cross-sectional view of the drive mechanism of FIG. 12.

The drive system for the frame consists of a drive mechanism 58 coupled to the front support 20. The drive mechanism 58 transitions the right 12 and/or left frame 14 between the open and closed positions by inserting or removing the inner tube 52 from the outer tube 54. With reference to FIG. 13, the drive mechanism 58 includes a cable drive 112 coupled to a first spool 114 and a second spool 116. It is understood that the spools 114, 116 may be separate structures or integrally formed. A first cable 118 and a second cable 120 are connected to the spools 114, 116. The first cable 118 and the second cable 120 are disposed within the hollow portion of the front support 20 and extend longitudinally along the length of the front support 20 from the frame joint 24 toward the upper end of the front support 20. The spools 114, 116 are configured such that when the first spool 114 is full, the second spool 116 is empty. Accordingly, when the stroller 10 transitions from the open position to the closed position, one spool is rotated to release the cable while the other spool winds the cable inward. In this way, the drive mechanism 58 pulls on the inner tube 52 to effectuate the transition to the closed position. When the stroller 10 is transitioned to the open position, the process is reversed, meaning that the spool which received the cable when closing the stroller releases the cable when opening and vice versa.

In one preferred non-limiting embodiment, the cable drive 112 is directly connected to the first spool 114 and the second spool 116 such that a single revolution of the cable drive 112 causes a single rotation of the spools 114, 116. In such a configuration, it is necessary that the spools 114, 116 have a narrow diameter so that only a small amount of cable is drawn in or released by each successive revolution of the cable drive 112. Accordingly, a narrow gauge cable must also be used to fit on the narrow spool. It has been determined that cables formed from synthetic polymers such as ultra high molecular weight polyethylene (UHMWPE) form an effective thin cable having good mechanical strength. Connecting the cable drive 112 directly to the spindle reduces the weight of the drive mechanism 58 by reducing the number of parts. Alternatively, the cable drive 112 may be connected to the spools 114, 116 through a gear box (not shown). The gear box permits slower revolution of the spools 114, 116, which permits use of a larger diameter spool and cable. However, adding a gear box to the drive mechanism 58 increases the total weight of the system.

Figure 14:
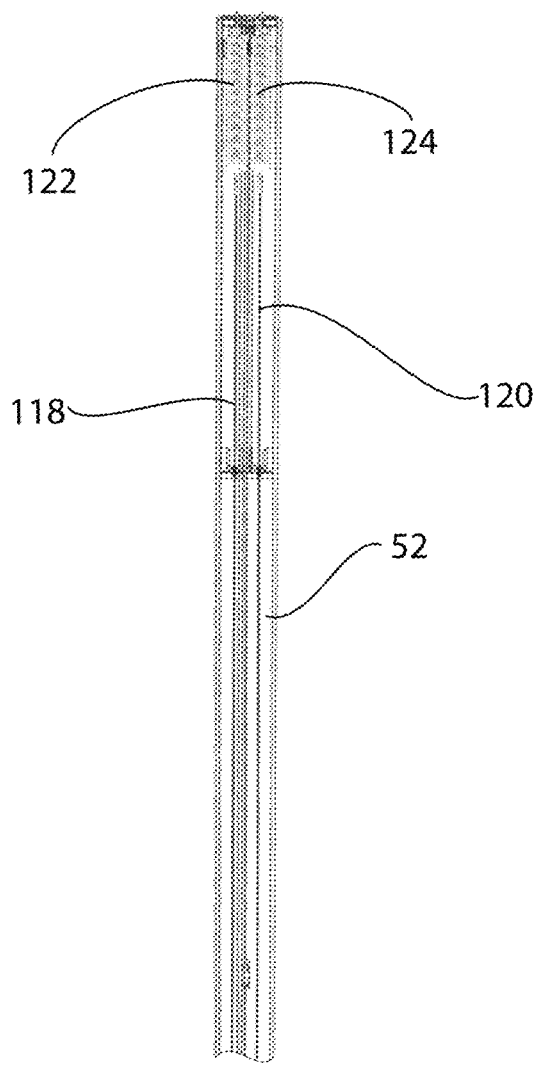
FIG. 14 is a cross-sectional view of the upper portion of the inner tube of the angled member of the stroller of FIG. 1.

With reference to FIG. 14, the present invention recognizes that for drive mechanisms 58 having narrow spools 114, 116, the difference in the amount of cable wound or unwound by each revolution of the spindle is substantially different based on whether the spool is fully loaded or empty. Therefore, in the cable drive system of the present invention, in which, at the beginning of the transition from closed position to the open position, one spool is empty and one is full, the amount of the cable being wound by one spool is substantially different from the amount of cable being unwound on the other spool. The discrepancy between the amount of cable being wound and unwound means that one cable will have excess slack when the drive mechanism is engaged. The excess slack could cause the cable to tangle during winding. To counteract this difference in the amount of cable being released, the drive system further includes a first biasing member, such as a first spring 122, and second biasing member, such as a second spring 124, connected in series with the first cable 118 and the second cable 120 and anchored to an upper portion of the front support 20. The springs 122, 124 remove excess slack from the cables 118, 120. In one non-limiting embodiment, the springs 122, 124 are in the extended position when the stroller 10 is open and closed. However, during the transition, while the drive mechanism 58 is engaged, the biasing members 118, 120 compress longitudinally toward the upper portion of the front support 20, thereby removing any slack in the cables 118, 120.

In the above described embodiment of the stroller 10 and drive mechanism 58, the stroller 10 includes only one drive mechanism 58 coupled to the front support 20. A single drive mechanism can be used as long as the stroller 10 is sufficiently rigid so that movement of one front support 20 causes corresponding parallel movement of the opposing front support 20. Alternatively, the stroller 10 may include a drive mechanism 58 coupled to each of the front supports 20. In that case, the drive mechanisms 58 may be configured to operate concurrently to synchronize movement (e.g., opening or closing) of the right frame 12 and the left frame 14.

Figure 15:
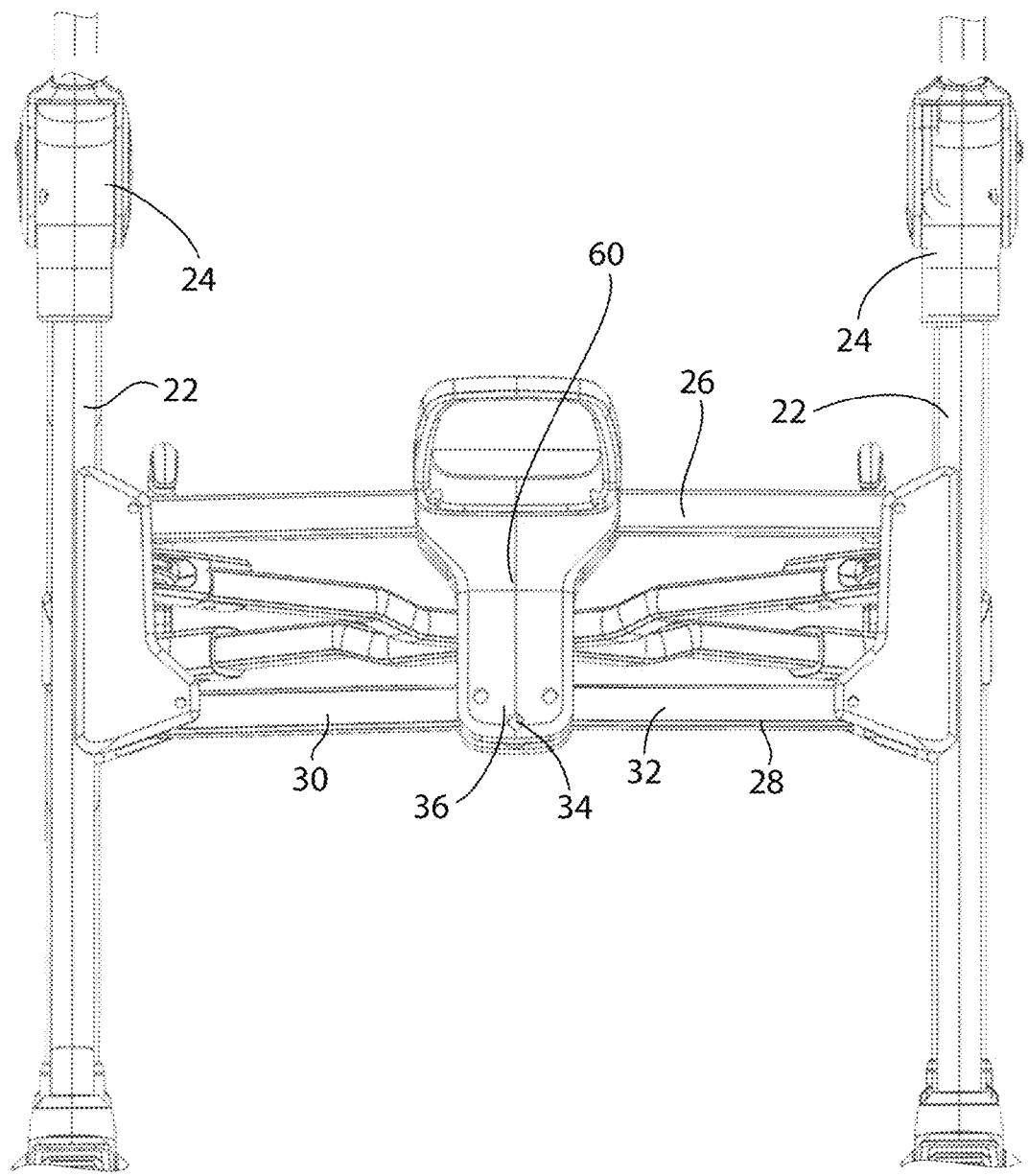
FIG. 15 is a magnified rear view of the stroller of FIG. 1 focusing on the parallelogram linkage and driving mechanism for the parallelogram linkage.
Figure 16:
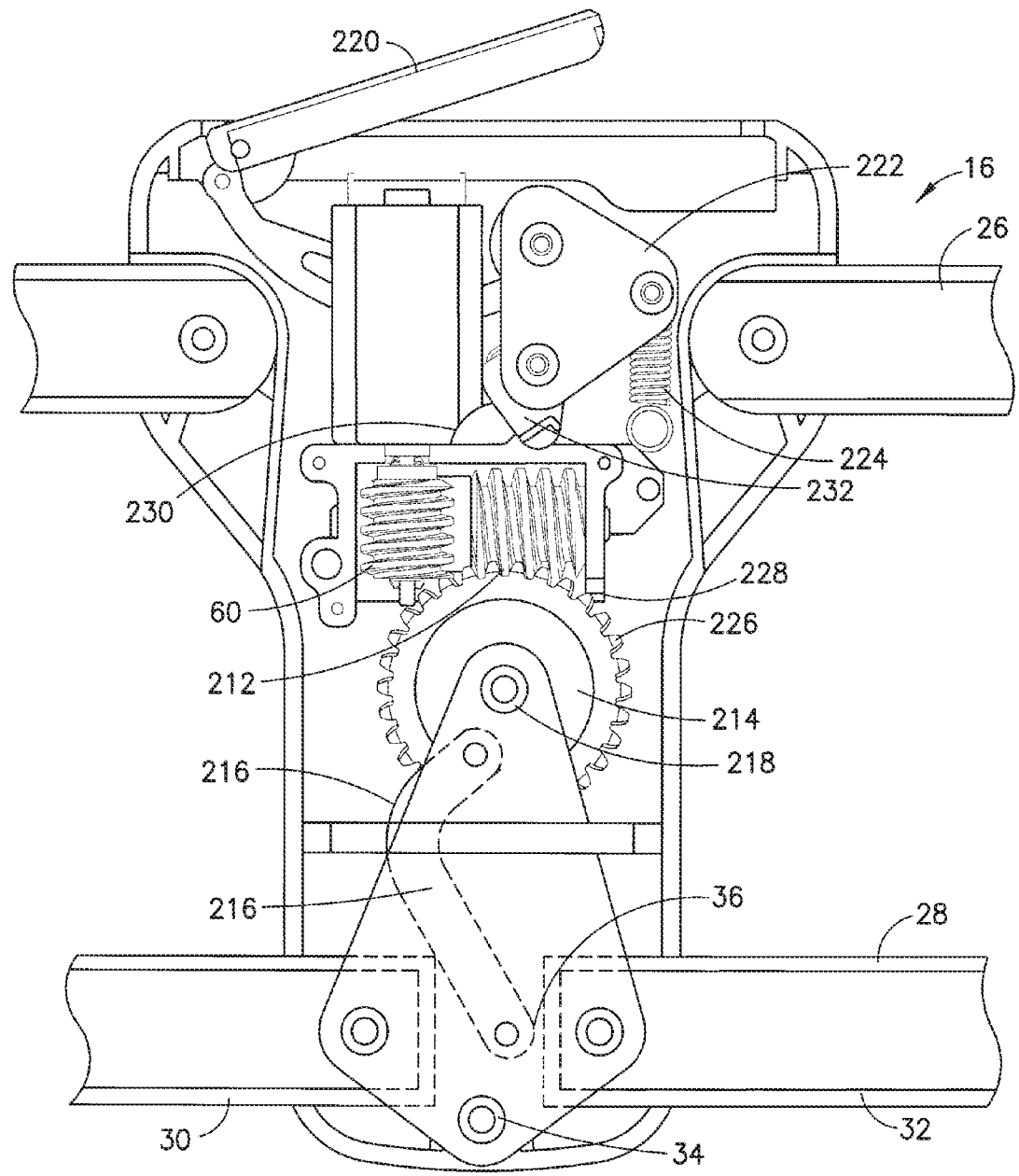
FIG. 16 is a magnified cross-sectional view of the drive mechanism for the foldable linkage of the stroller of FIG. 1 with the horizontal members in the extended position.

With reference to FIGS. 15-16, the stroller 10 may further include a drive mechanism 60 coupled to the parallelogram linkage 16 for transitioning the horizontal members 26, 28 of the parallelogram linkage 16 from the extended position (when the stroller 10 is in the open position) to the folded position (when the stroller 10 is in the closed position). The drive mechanism 60 should also function as a latch or locking member for maintaining the parallelogram linkage 16 in the open position. In a preferred non-limiting embodiment, the drive mechanism 60 is driven by an electric motor; however, other drive mechanisms as are known in the art (mechanical, hydraulic, etc.) may also be used within the scope of the invention.

With specific reference to FIG. 16, in one non-limiting embodiment, the drive mechanism 60 includes a screw drive 212 coupled to a rotatable gear 214. Rotation of the gear 214 drives a locking support element 216 which is connected between the gear 214 and the folding joint 34 of the lower horizontal member 28. When the parallelogram linkage 16 is in the open (e.g., extended) position, the locking support element 216 is a latch for preventing the horizontal members 26, 28 from folding. More specifically, in the open position, the locking support element 216 is approximately singular (i.e., in alignment) with an axis 218 of the gear 214 to effectively counteract any upward or downward force applied to the horizontal members 26, 28. However, the drive mechanism 60 is configured so that the gear 214 and locking support element 216 are stopped just short (e.g., approximately 10 degrees short) of the singular (i.e. aligned) position. Stopping rotation of the gear 214 short of the singular position ensures that the gear 214 will not be accidently rotated past the singular position. Since the drive mechanism 60 cannot be driven backwards, if the gear 214 were accidently advanced past the singular position, the transition between the closed and open position would need to be repeated to lock the horizontal member 26 in place. It has been determined that maintaining the locking support element 216 in an approximately singular position (within 10 degrees of singular) is sufficient to counteract folding forces and to effectively maintain and lock the parallelogram linkage 16 in the open position.

With continued reference to FIG. 16, in one non-limiting embodiment, the drive mechanism 60 further includes a manual override clutch for transitioning the drive mechanism 60 from an automatically folding configuration to a manually folding configuration. The manual clutch includes a lever 220 coupled to a rotatable cam 222. In the engaged (i.e., automatic) configuration, the lever 220 orients the cam 222 to exert a downward force on the screw drive 212 to maintain contact between the screw drive 212 and gear 214. A spring 224 also coupled to the cam 222 provides additional downward force for maintaining the contact between the screw drive 212 and gear 214. When the lever 220 is released (i.e., transitioned to the manual position), the cam 222 rotates, thereby disengaging the screw drive 212 from the gear 214. When the screw drive 212 is disengaged from the gear 214, the user can manually fold the stroller 10 by applying downward force to the horizontal members 26, 28.

A potential problem with a screw drive 212 which is configured to engage and disengage with a gear 214 is aligning the threads 226 of the screw drive 212 with the teeth 228 of the gear 214. If the threads 226 and teeth 228 are not aligned when contact between the gear 214 and screw drive 212 is established, the possibility exists that the threads 226 will be pressed against the upper portion of the gear teeth 228, rather than into the gear 214, causing damage to the teeth 228 and/or threads 226. In a preferred embodiment, the drive mechanism 60 prevents damage to the teeth 228 and gears 214 by initially applying a light preload and slowly rotating the screw drive 212 until the gear teeth 228 and threads 226 of the screw drive 212 catch and align. Once the gear 214 and threads 226 are correctly aligned, additional compressive force between the screw drive 212 and gear 214 is applied and the rotation speed of the screw drive 212 is increased. However, the gears 214 and screw drive 212 are not subjected to this additional force until it is determined that the screw thread 226 and gear 214 are aligned. In certain embodiments, the drive mechanism 60 further comprises a sensor (not shown) for determining whether the screw drive 212 and the teeth 228 of the gear 214 are correctly aligned. If the sensor determines that the alignment is correct, there is no need to apply the light preload force for aligning the gear 214. If the sensor determines that the gear 214 is not in alignment, the light preload is applied. In an alternative embodiment, the drive mechanism 60 does not include an alignment sensor. In that case, the preload pressure will be applied each time that the gear 214 is brought into contact with the screw drive 212, whether or not they are in alignment.

The drive mechanism 60 may further include a visual indicator (not shown) such as a display, switch, or lighted button for informing the user about what position the drive system is in. For example, the visual indicator could indicate three possible stages: auto, in which the gear 214 and screw drive 212 are engaged and locked together such that full power can be applied to open or close the stroller 10; manual, in which the gear 214 and screw drive 212 are not engaged allowing users to manually open or close the stroller 10; or auto but disengaged, in which the gear 214 is not properly aligned and light pressure will be applied to align the gear 214. Alternatively, the position of the lever 220 may be sufficient to indicate to a user whether the clutch is in the automatic or manual position.

The present invention also recognizes the possibility that a user may try to force the stroller 10 to close while the drive mechanism is in the automatic position and the gear 214 is engaged with the screw drive 212. Such forcing motion would potentially strip the gear 214 damaging the driving mechanism 60. To counteract such forcing motion, in one preferred embodiment, the drive mechanism 60 is configured to automatically transition from the engaged to disengaged position. Specifically, when a user applies substantial downward force to the horizontal members 26, 28, the cam 222 will rotate, thereby disengaging the screw drive 212 from the gear 214.

With reference to FIGS. 13 and 15, the drive mechanisms 58, 60 further include a synchronizing connection between the frame drive mechanism 58 and the parallelogram drive mechanism 60 to ensure that the frame drive mechanism 58 will not engage when the parallelogram drive mechanism 60 is in the manual (i.e., disengaged) position. In one non-limiting embodiment, the connection 230 includes a rotatable cam 232 coupled with the parallelogram drive mechanism 60 which is in mechanical connection with a corresponding rotatable cam 126 of the frame drive system 58 through a cable 230. When the parallelogram drive mechanism 60 transitions from the engaged position to the disengaged (i.e., the manual) position, the cam 232 rotates causing the corresponding cam 126 of the frame drive mechanism 58, which is connected by the cable 230, to rotate. Rotation of the cam 126 of the frame drive mechanism 58 causes the cable drive 112 to disengage from the spools 114, 116 to prevent rotation. When the parallelogram drive mechanism 60 is transitioned to the automatic position, the cam 126 of the frame drive mechanism 58 is rotated to reinitiate connection between the spools 114, 116 and cable drive 112 to permit folding movement of the front support 20.

Figure 17:
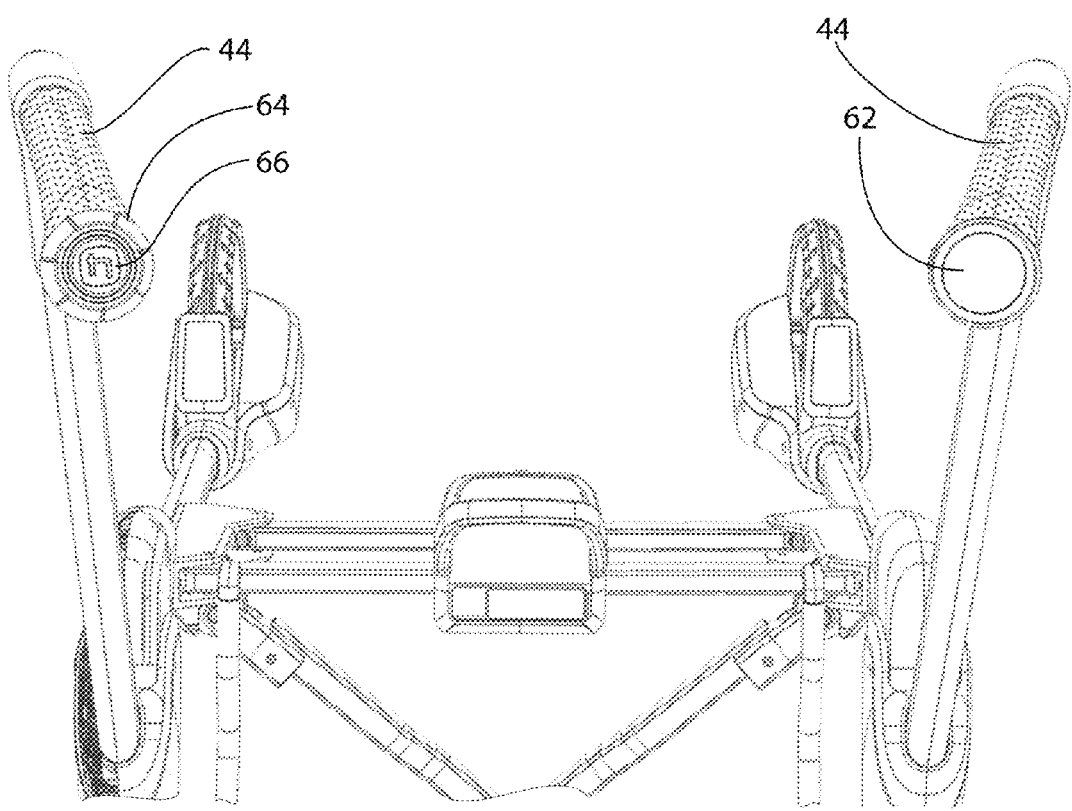
FIG. 17 is a top view of the stroller of FIG. 1 focusing on the a handles, activation button, and LCD screen.
Figure 18:
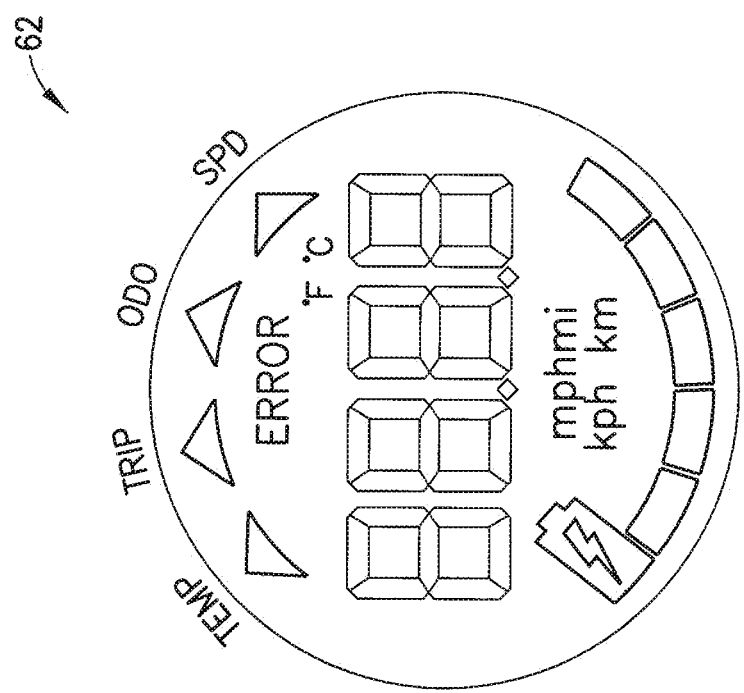
FIG. 18 is a magnified view of the LED screen of the stroller of FIG. 1, positioned on the handle bar assembly.

In addition to the above described drive mechanisms 58, 60, the stroller 10 may include numerous other electrical systems within the scope of the present invention. For example, the stroller 10 may include headlights, daytime running lights, as well as a user interface system. Several user interface options are provided within the scope of the present invention ranging from a simple interface to a complete interface offering information about the stroller 10 and surrounding environment. With reference to FIGS. 17-18, in one embodiment, the user interface is presented on a LCD visual display 62 disposed on an end of the handles 44 of the stroller 10. An exemplary schematic drawing of a visual interface 62 in accordance with the present invention is depicted in FIG. 18. The visual interface 62 displays information from the plurality of sensors on the stroller 10 including speed, baby on board, open or closed, as well as, temperature, total distance traveled, and time, as well as other relevant information important to a user.

In one non-limiting embodiment, the electronics systems of the stroller 10 are powered by an on-board battery that is charged as the stroller is pushed. In certain embodiments, this charging is accomplished by generators housed in the stroller wheels 46, 48 combined with circuitry used to direct the power generated by the stroller 10 back into the battery. An exemplary generator for use with a power folding stroller is disclosed in U.S. Pat. No. 8,193,650, issued on Jun. 5, 2012, which is hereby incorporated by reference in its entirety. Optionally, the stroller may also be charged via an AC adapter, such as a wall adapter.

In one non-limiting embodiment, the above described electronics (e.g., drive mechanisms, sensors, headlights, visual displays, and odometers) are controlled by one or more microcontrollers. Although all control can be handled by a single microcontroller, it is sometimes advantageous to use multiple microcontrollers for a cost advantage. For example, one or more microcontrollers are used to control and monitor the various electronic components associated with power folding and unfolding. In one preferred embodiment, the drive mechanisms are controlled via several of the microcontroller ports which in turn control the motor drive electronics. In one embodiment, the motor drive electronics consist of an H-bridge style circuit allowing the motors to be run in a bi-directional manner and at various speeds via pulse-width modulation (PWM). The microcontroller may utilize several addition ports to monitor various sensors which provide information about the position of the frame, the position of the latch, and whether the stroller 10 has a child onboard. Remaining microcontroller ports are dedicated to a user interface of the stroller 10, which provides a means for the user to interact with the stroller 10 and where the stroller 10 communicates information to the user.

In certain configurations, the various electronic components of the stroller 10 are controlled by software systems responsible for utilizing the electrical system to manipulate the mechanical system in a safe and efficient manner. Sensors contained in the electrical system are routed back from the microcontroller which contains the software used to process the sensors data and determine an appropriate action. There are three major sections to the software.

The first section handles the user interface where information is communicated to the user regarding the state of the stroller's mechanical and electrical systems, and where the user can interface with the stroller 10, for example, to request the stroller 10 to fold or unfold. The second section handles monitoring the state or condition of the stroller 10. The software will interpret the various signals received from the sensors and determine whether the stroller 10 is in a useable state (e.g., mechanically and structurally sound), whether the stroller 10 is occupied, whether the stroller 10 is broken, etc. The third section handles the motion of the stroller 10 through the folding and unfolding process. Throughout the folding and unfolding process, the software must monitor various safety protocols to protect the occupant, the user, and the mechanics.

In one embodiment, the software for controlling folding and unfolding comprises an activation sequence controlled through an activation switch 64. The activation sequence may include obtaining information from one or more object sensors having the ability to detect the presence of objects within the interior portion of the stroller 10 and to interrupt and/or prevent movement of the stroller 10 in the direction toward its collapsed condition when the object sensor detects the presence of an object within the interior portion of the stroller 10. The object sensor or sensors may be of any known type such as a mechanical weight sensor, a proximity sensor, a motion sensor, a light beam sensor, or any other device having the ability to detect the presence of an object within the interior of the stroller 10. The sensor or sensors may be electronic and may send a signal that is electrically acted upon to prevent or interrupt power to the motor, and/or the sensors may be mechanical and actuate a physical lock or a brake to prevent further collapsing or the full collapsing movement of the stroller 10. Sensors may also be used to detect the presence of modular add-on devices connected to the stroller 10, such that movement of the stroller 10 to its collapsed condition is prevented when a connected add-on is detected, thereby preventing potential damage to the add-on device.

In a preferred embodiment, the activation switch 64 is a dead man switch disposed on the handles 44 of the stroller 10. A dead man switch must be engaged (i.e., pressed downward) throughout the entire opening or closing movement. Releasing the switch pauses the folding or unfolding movement of the stroller 10. Pressing the switch a second time continues the movement. The switch may further include a twisting element 66 for priming the activation sequence prior to initiating the opening or closing action.

Figure 19:
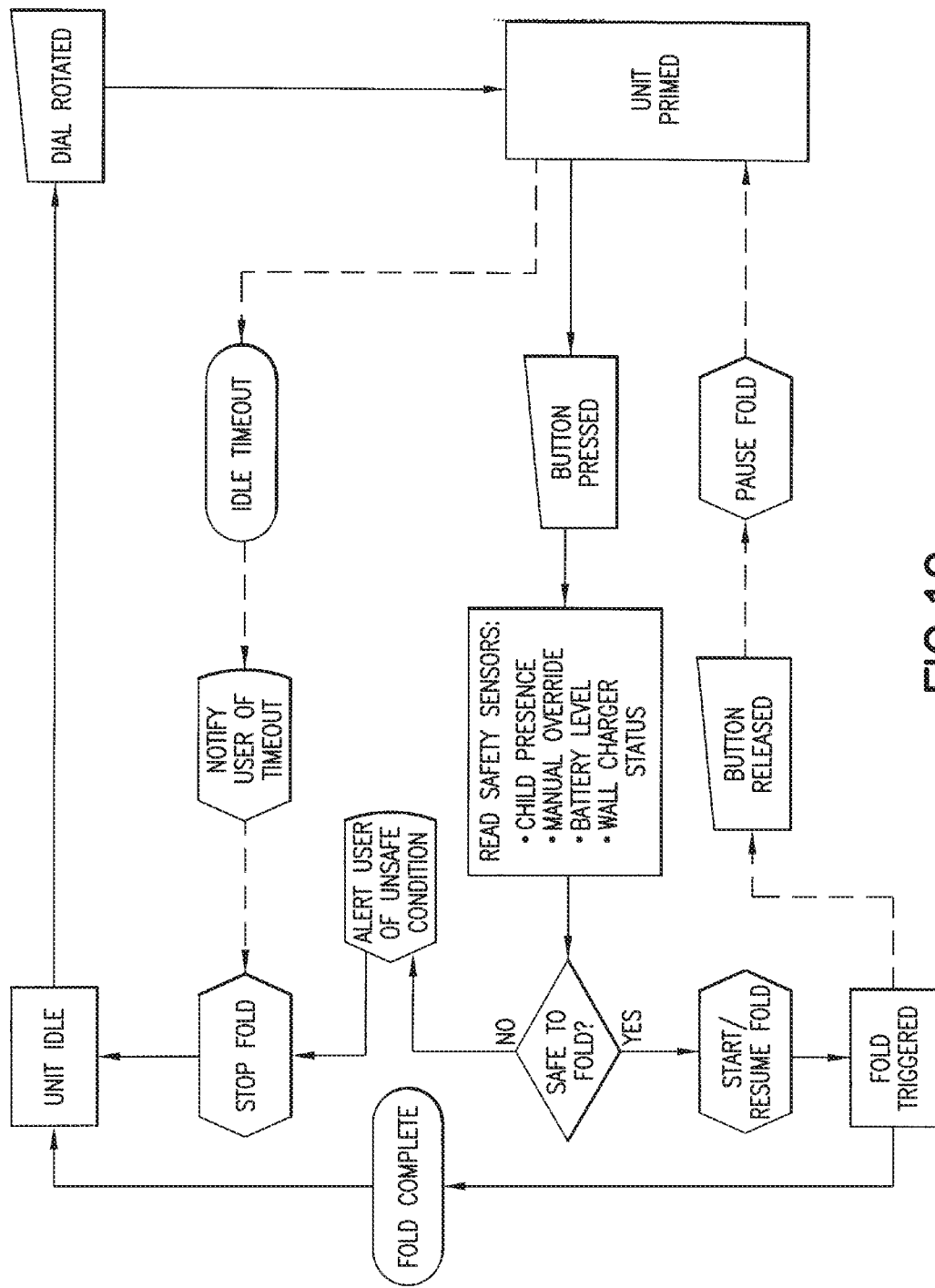
FIG. 19 is a block diagram depicting the activation sequence of the stroller of FIG. 1.

With reference to FIG. 19, a non-limiting embodiment of the activation sequence for the stroller 10 is depicted. As indicated in the exemplary activation sequence, at most times, the stroller 10 control unit is idle. Engagement of a twisting element 66 or dial primes the control unit, essentially waking it up from idle. The activation switch 64 may include an indicator, such as a sound or light, that demonstrates that the control unit has transitioned from idle to primed. After priming, the user initiates activation (opening or closing the stroller 10) by pressing the activation switch. In certain embodiments, the unit will only remain primed for a limited time period, after which, the unit will "timeout". At that point, the unit may include means to inform the user that the priming has timed out and the unit is returning to idle. When the activation switch 64 is engaged (i.e., depressed), the unit is configured to receive and evaluate safety data from a plurality of safety sensors disposed on the stroller 10. Relevant safety data includes whether a child is present, whether the clutch is in the manual position, and the battery level of the power supply. The stroller 10 may also monitor external conditions such as whether the stroller is connected to an external power source, in which case folding or unfolding may be prevented. In certain embodiments, the stroller may alert the user of unsafe conditions such as by describing the condition on a visual display 62. If the sensors indicate that the stroller 10 is safe to fold or unfold, the folding movement is started or resumed. Folding continues until folding is complete or until the activation switch 64 is released to pause the folding process. When folding is paused, the unit remains primed until either the button is pressed to resume folding or until the unit times out and returns to idle.

The software further includes a frame folding sequence integrated with sensors for determining frame position. The position sensors utilized at selective locations on the frame to send a signal indicative of the positions of one or more components or elements of the stroller 10. The position sensors can be used for several purposes, such as sending a signal to the display to provide a visual and/or audio indication to the user as to the current position or of the deployment or the collapsing of the stroller 10, and/or to provide an interrupting signal (or non-signal) if a position sensor or sensors are not engaged as they would be during proper deployment and/or collapsing of the stroller 10. Any one or more of several known types of sensors may be utilized, such as rotary encoders at any one or more frame component pivot points, and/or limit or contact switches which are engaged as selective elements of the stroller 10 move to their proper positions, or improper positions, during deployment and/or collapsing of the stroller 10. By way of example, position sensors may be mounted to the stroller 10 at positions which provide indication that the stroller 10 has moved to its fully-deployed condition, its fully-collapsed condition, or any condition in-between; and/or position sensors may be mounted at locations to detect the engagement or lack of engagement of latches. Position sensors may operate in conjunction with electronic timer controls such that a signal to effect stoppage of power to the motor is sent if the position sensor is not engaged within a predetermined time period.

Figure 20:
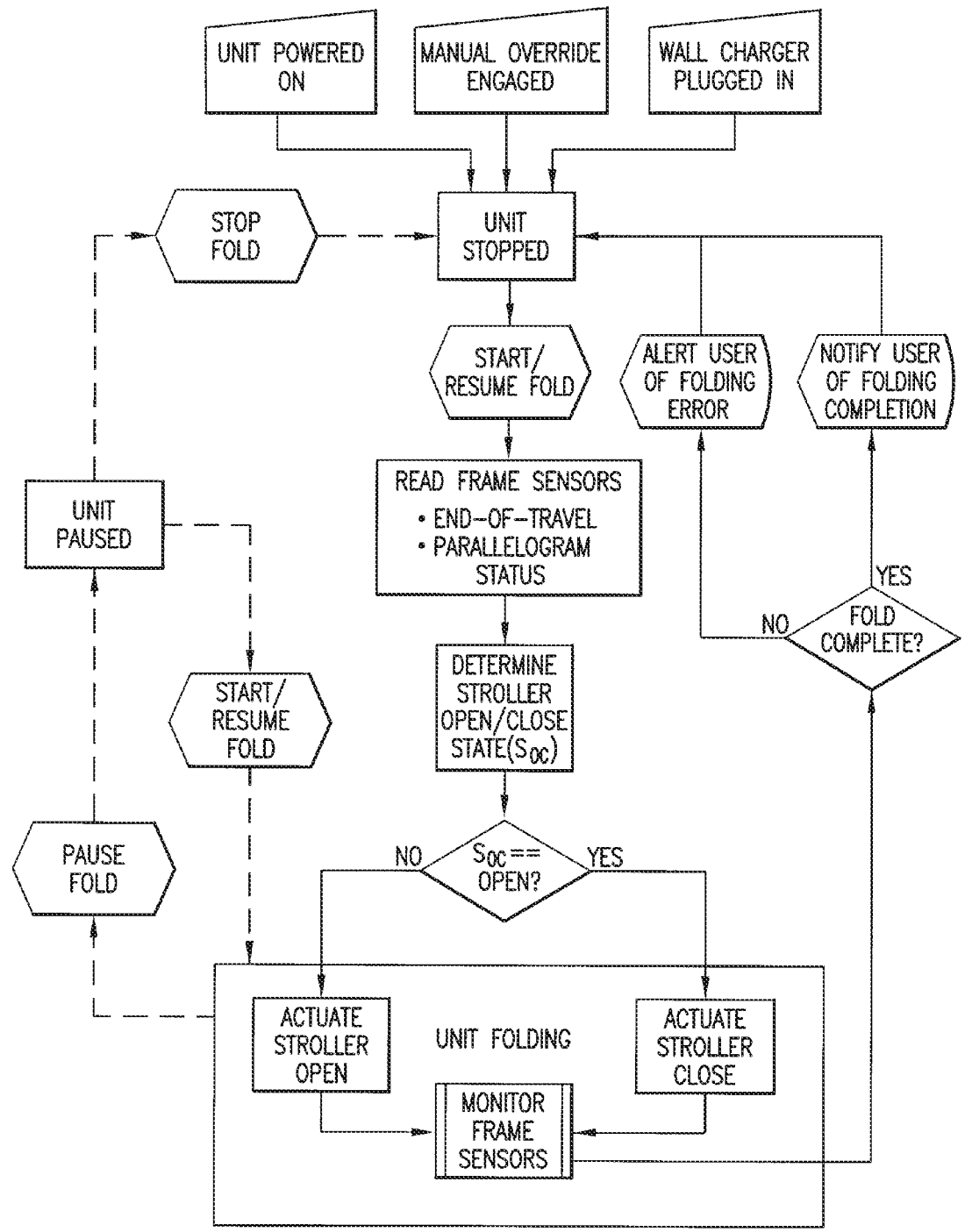
FIG. 20 is a block diagram depicting the folding sequence of the stroller of FIG. 1.

With reference to FIG. 20, in one preferred and non-limiting embodiment, the frame folding process begins by receiving information about whether the unit power is on, whether the manual clutch override is engaged, and whether the wall charger is plugged in. The unit controller must be turned on during folding. However, folding is prevented when the clutch is in the manual position and when the stroller is plugged into a wall charger. When folding is activated by pressing the activation button, the unit receives information from a plurality of frame sensors including the status of the parallelogram linkage 16 (latched or unlatched), the location of the sliding joint 40 (down or up), or whether the telescoping tube is extended or nested. The information from the frame sensors is used to determine whether the stroller 10 is in the open or closed position. Based on the information, actuation of the stroller 10 open or stroller 10 close functionality occurs. During actuation, the unit continues to monitor the frame sensors to determine when opening or closing is complete. If folding or unfolding is completed, the user is notified that the action was successful. Otherwise, the user is alerted that a folding error occurred. It is noted that, as described with regard to the activation sequence, the user can pause folding by releasing the dead man switch. Folding is resumed by pressing the switch to continue folding or unfolding actuation. If the unit remains paused for a period of time, folding times out and the unit returns to the idle or stop folding position until the user reactivates the system by priming the activation switch.

Figure 21:
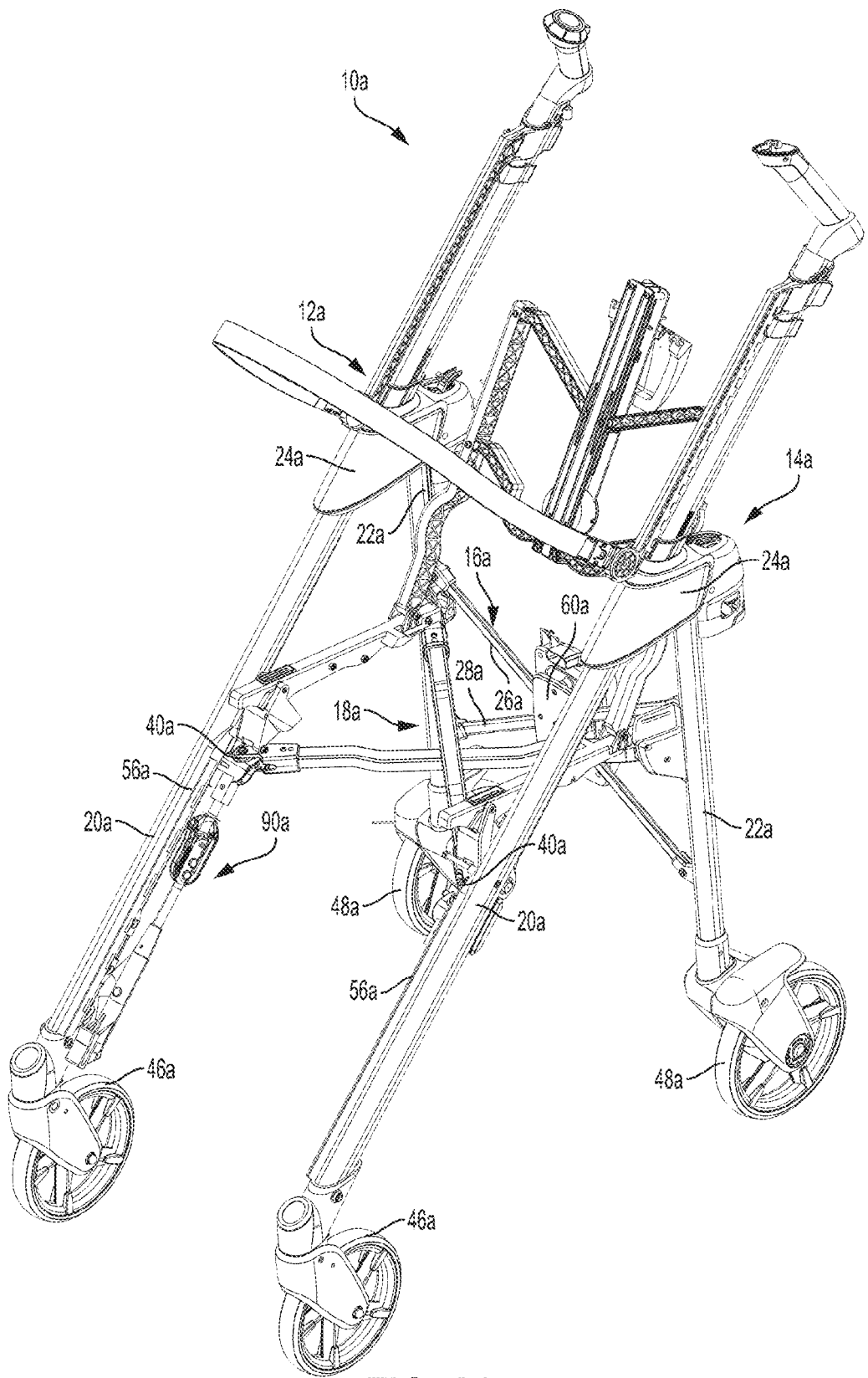
FIG. 21 is a forwardly directed perspective view of another embodiment of a collapsible stroller, according to an aspect of the invention, shown in its open position.
Figure 22:
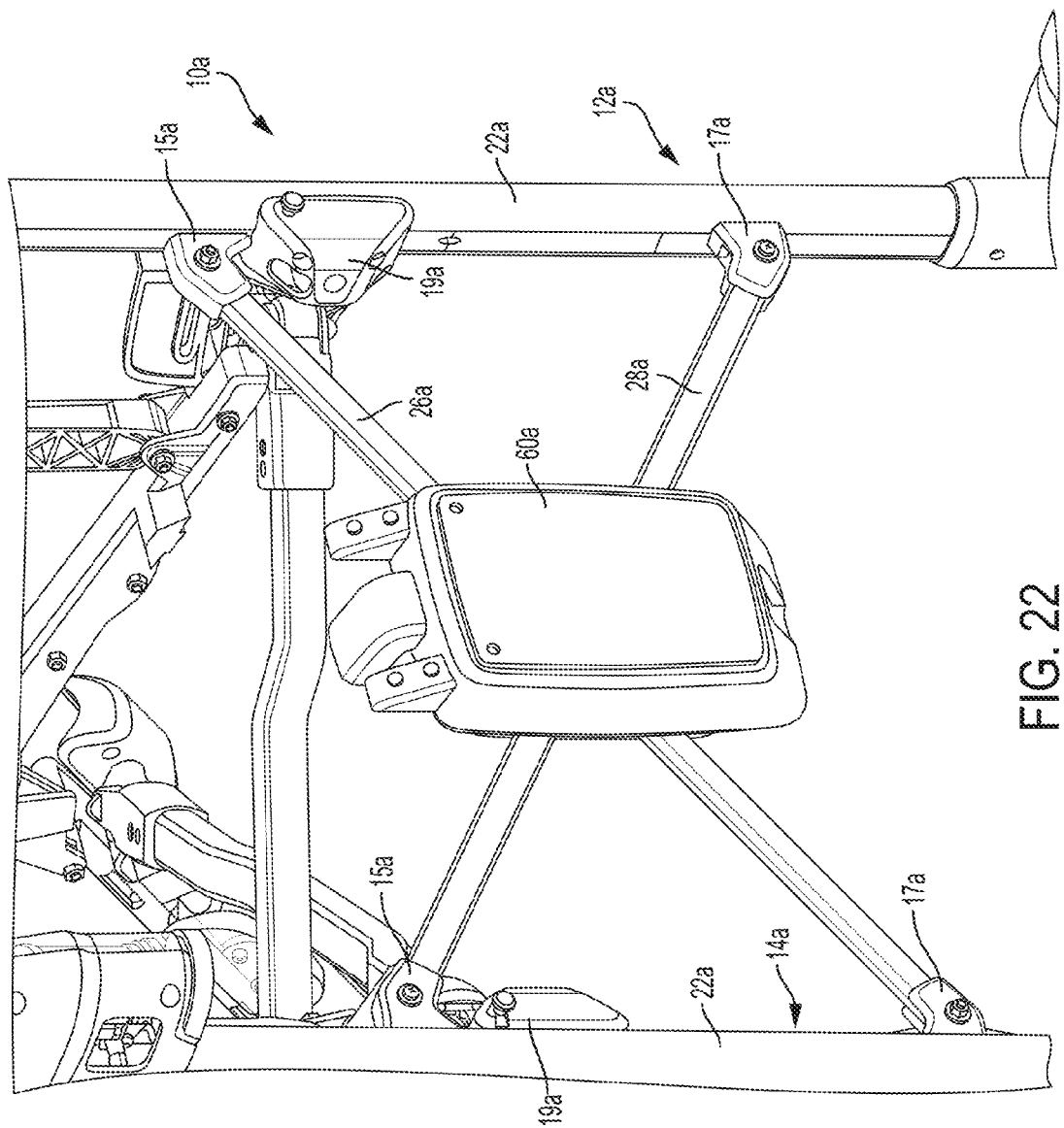
FIG. 22 is a rearwardly directed perspective view of the stroller of FIG. 21 shown in its open position and focusing on a rear linkage assembly.
Figure 23:
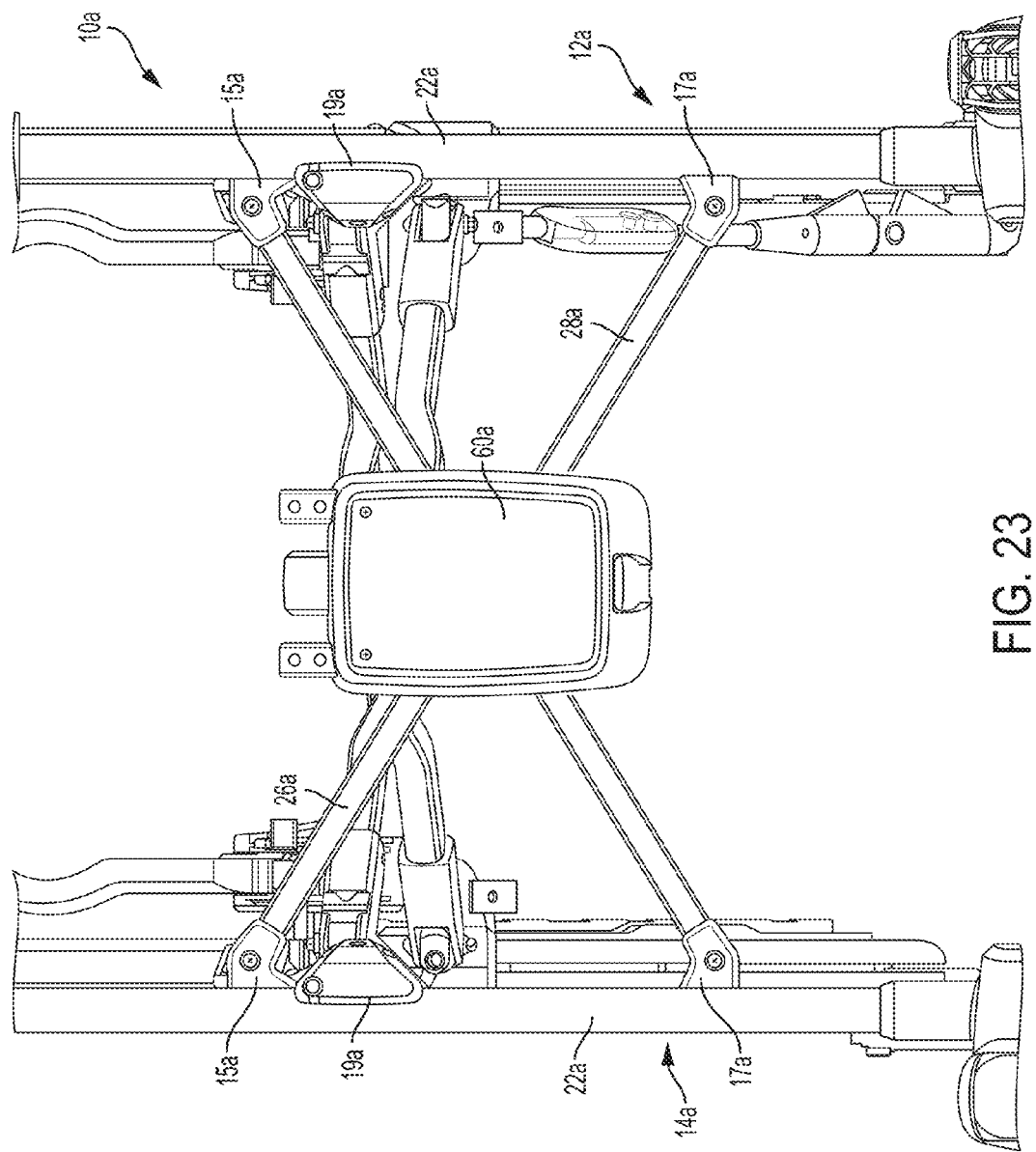
FIG. 23 is a back view of the stroller of FIG. 21 shown in its open position and focusing on the rear linkage assembly.
Figure 24:
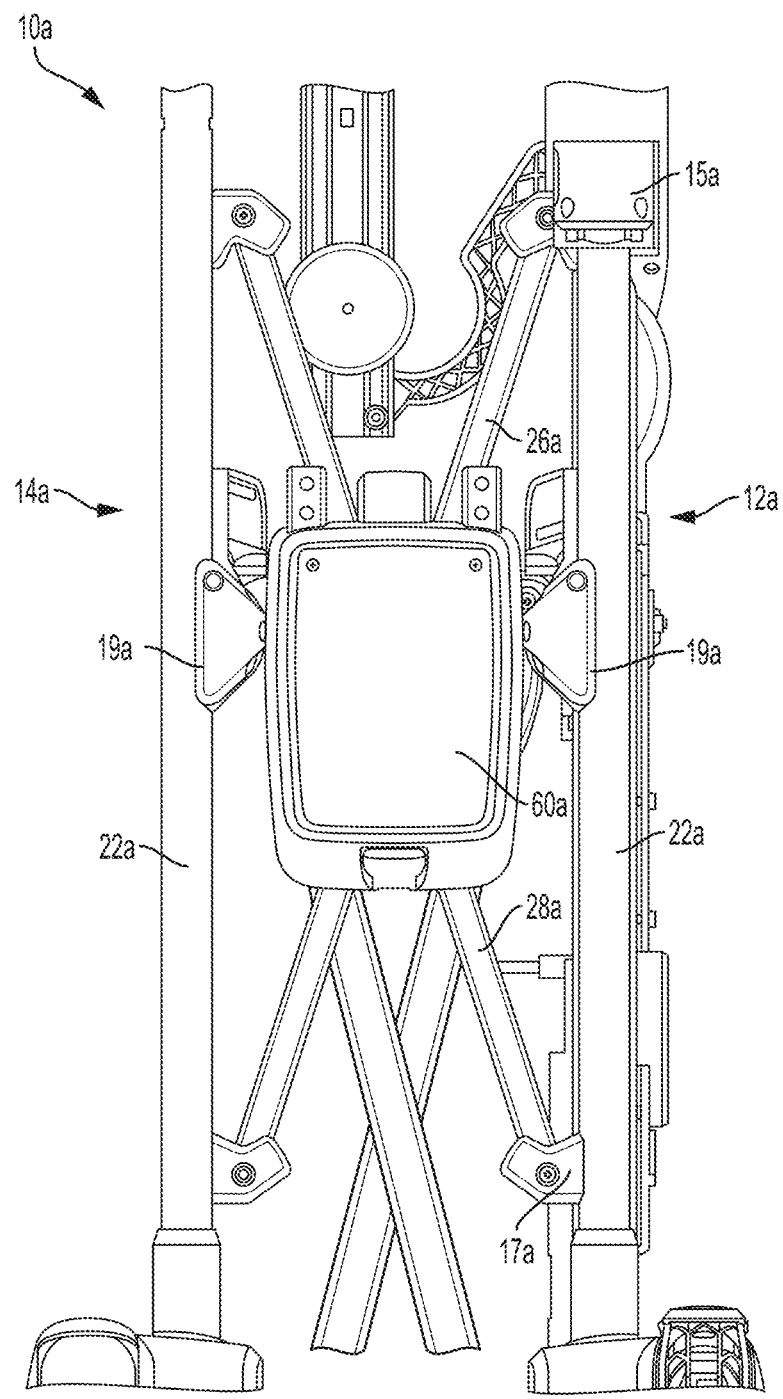
FIG. 24 is a back view of the stroller of FIG. 21 in its closed position and focusing on the rear linkage assembly.

With reference to FIGS. 21-26, another embodiment of a collapsible stroller 10a is illustrated. As in previously described embodiments, the stroller 10a includes a frame with a right side (referred to herein as right frame 12a) and a left side (referred to herein as left frame 14a). The frame is supported by front wheels 46a and rear wheels 48a (shown in FIGS. 21 and 25-26). The frame is transitionable from an open position to a closed position. As was the case in previously described embodiments of the stroller 10, the frames 12a, 14a can be formed from hollow tubular members and/or telescoping assemblies to reduce the weight and/or to improve appearance. The right frame 12a and left frame 14a are substantially identical in appearance and construction. The right frame 12a is described hereinafter. However, it is understood that the left frame 14a is constructed to mirror the right frame 12a. The right frame 12a includes a front support 20a rotatably connected to a rear support 22a at a frame joint 24a. The front support 20a and the rear support 22a are moveable from an open position to a closed position. In the open position, the front support 20a is positioned at approximately a 45 degree angle relative to the rear support 22a. In the closed position, the front support 20a and rear support 22a are approximately parallel. However, these angles are not intended to be limiting and may vary within the scope of the present invention. In one exemplary embodiment, the stroller 10a in the open position is depicted in FIGS. 21-23. The stroller 10a in the closed position is depicted in FIG. 24.

As shown in FIGS. 21-24, the right frame 12a and the left frame 14a are connected by one or more linkage assemblies, such as a rear linkage 16a and a horizontal or seat linkage 18a. The horizontal linkage 18a is substantially equivalent to the scissor linkage 18 (shown in FIGS. 1-4) discussed above in connection with previously described embodiments. The rear linkage 16a replaces the previously described parallelogram linkage 16 (shown in FIGS. 1-4).

In some embodiments, the rear linkage 16a is a scissor or x-shaped assembly including a first member 26a or beam and a second member 28a or beam. The first member 26a and the second member 28a extend between the right frame 12a and the left frame 14a, and are connected to one another at a central pivot point or joint, located behind the battery pack 60a (shown in FIGS. 21-24). The first member 26a and the second member 28a are connected to the right frame 12a and the left frame 14a respectively at sliders 15a, 17a (shown in FIGS. 23-24). Specifically, the sliders 15a, 17a comprise a rotatable connector attached to ends of the member 26a, 28a and a protrusion or fin (not shown) extending therefrom. The protrusion or fin is slidably inserted in a slot or channel extending longitudinally along a portion of each rear support 22a.

In use, as the stroller 10a transitions from the open position to the closed position, the rear supports 22a rotate toward the front supports 20a and the right frame 12a moves toward the left frame 14a. As a result of the movement of the right frame 12a toward the left frame 14a, the sliders 15a, 17a move away from one another. When the stroller 10a is in the closed position, the sliders 15a, 17a are constrained within the slots of the rear supports 22a, but are otherwise free to move in the up and down directions. This configuration is referred to as a fully floating configuration, since the ends of each member 26a, 28a freely move in the up and down directions within the slots or channels. As the stroller 10a transitions from the closed position to the open position, the sliders 15a, 17a move toward one another. In the fully open position, upper sliders 15a rest against fixed joints 19a (shown in FIGS. 21-24) and are prevented from moving farther in the downward direction. Accordingly, in this fully open position, the linkage 16a is able to provide stiffness to the frame 12a, 14a and endure operational loads for the stroller 10a.

As shown in FIGS. 21-24 electronic devices, such as a battery pack 60a can be connected to the rear linkage 16a. The battery pack 60a can include batteries and other electronic devices for providing power to electrical system of the stroller 10a, such as the drive mechanism, described hereinabove, that opens and closes the stroller 10a. In the embodiment illustrated in FIGS. 21-24, the battery pack 60a does not include motors or mechanical systems for moving the rear linkage 16a. However, in other embodiments, a dedicated motor or drive mechanism may be enclosed in the battery pack 60a and integrated with the rear linkage 16a to effectuate folding and unfolding of the rear linkage 16a. The motor or drive mechanism may be configured to operate simultaneously and in conjunction with drive mechanism for other portions of the stroller 10a. Alternatively or in addition, the rear linkage 16a can include one or more latch or lock mechanisms. The latch or lock mechanism can maintain the rear linkage 16a in its open and/or closed position and prevent, for example, a user from attempting to open or close the stroller 10a manually (e.g., without operating the drive mechanisms). In some embodiments, the latch or lock mechanism can engage or disengage automatically prior to actuating the drive mechanism to transition the stroller 10a from the open position to the closed position or vice versa.

Figure 25:
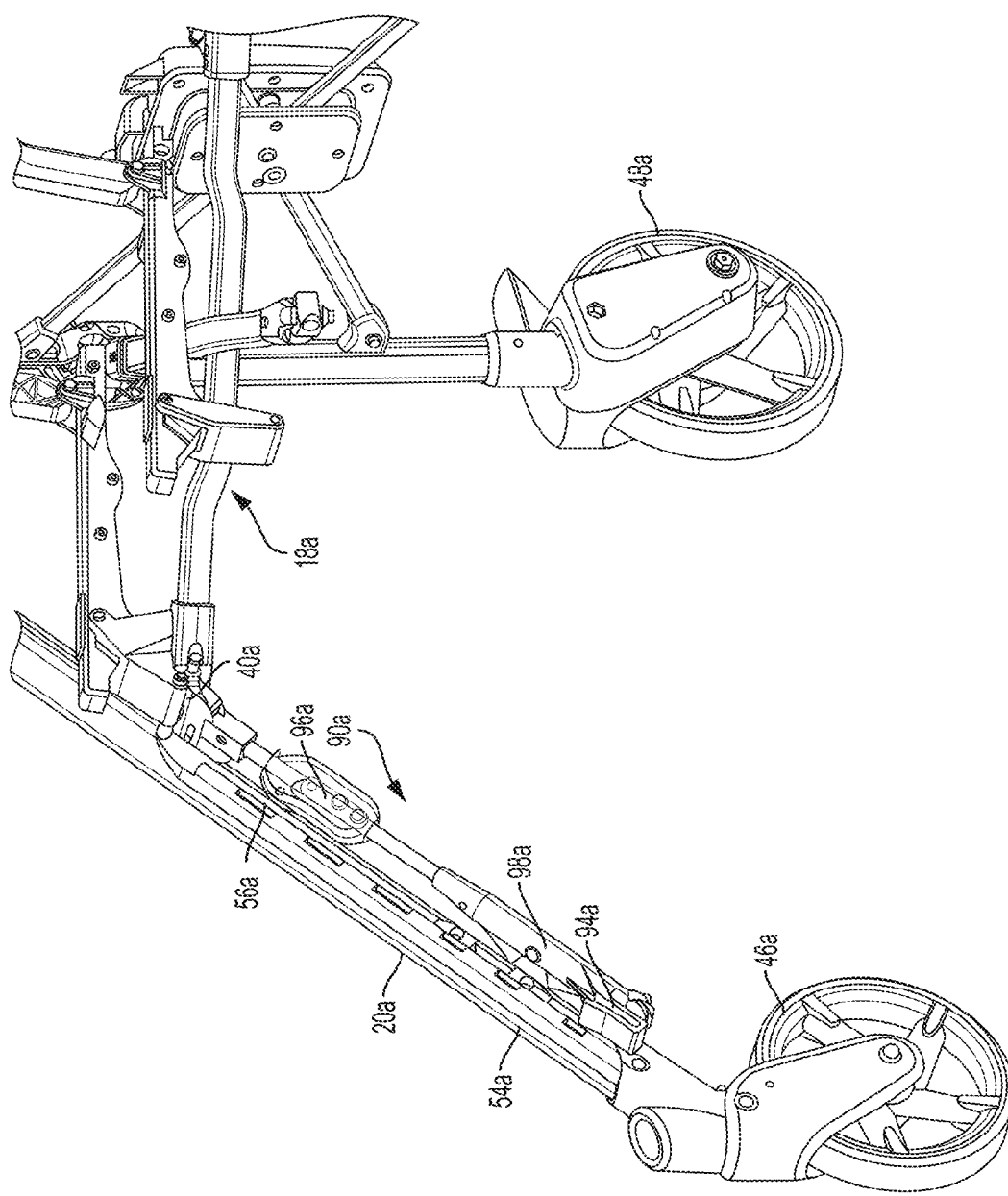
FIG. 25 is a perspective view of a portion of the stroller of FIG. 21 in its open position and focusing on a stand structure.
Figure 26:
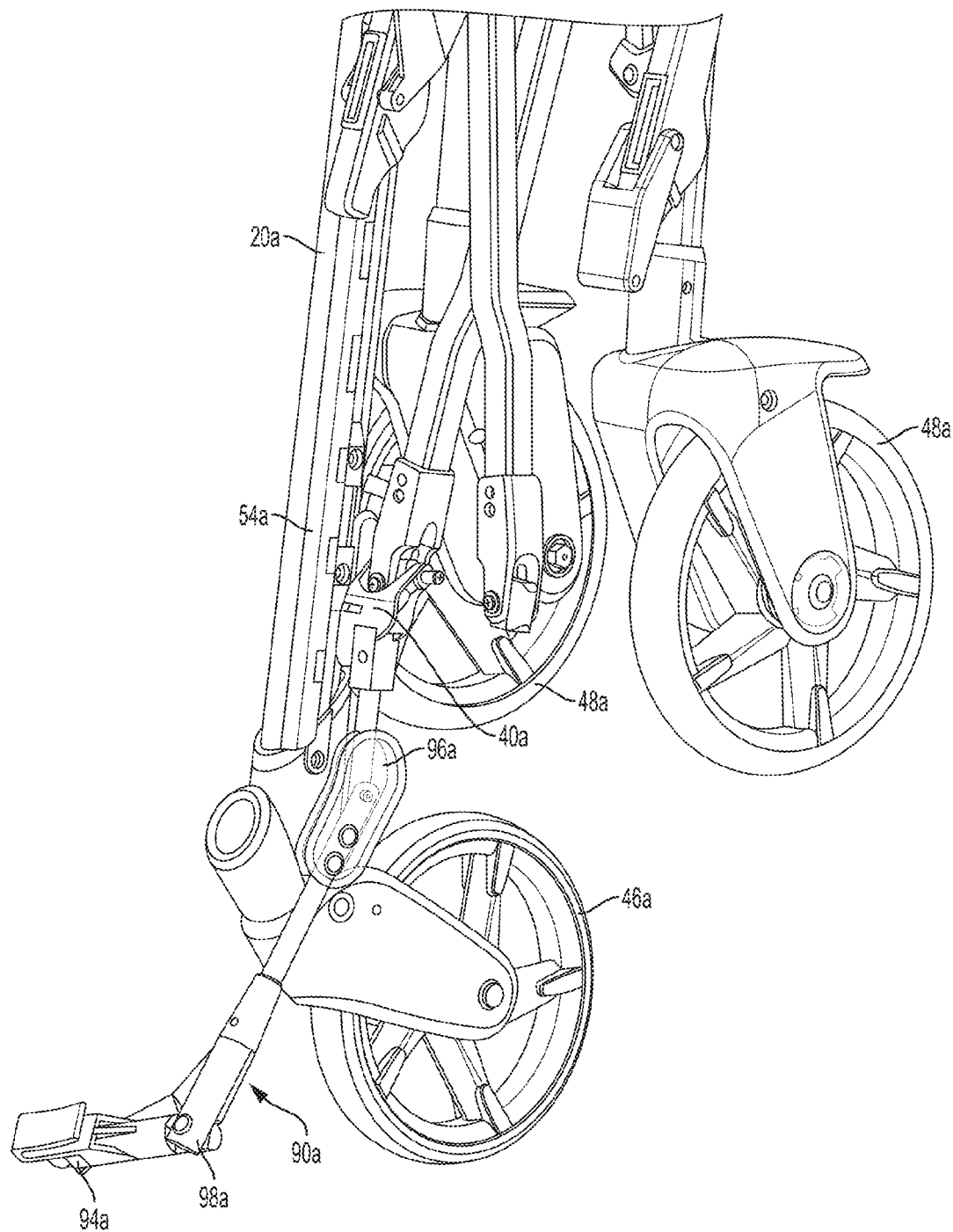
FIG. 26 is a perspective view of a portion the stroller of FIG. 21 in its closed position and with the stand structure in an extended position.

With reference now to FIGS. 21 and 25-26, a kickstand or foot stand (referred to herein as a stand structure 90a) for the stroller 10a is illustrated. The stand structure 90a is configured to automatically extend from the frame 12a, 14a when the stroller 10a transitions to the closed position. It is noted that in FIGS. 21 and 25-26, the stand structure 90a is only shown extending from the front support 20a of the right frame 12a. However, the stroller 10a can include a stand structure 90a connected to the front support 20a of both the right frame 12a and the left frame 14a for improved stability.

The stand structure 90a functions as follows. The stand structure 90a is mounted to a portion of the sliding joint 40a or key and is partially inserted in the slot 56a or channel extending longitudinally through the front support 20a of the frame 12a, 14a. The stand structure 90a can be an elongated rigid member that, when the stroller 10a is in its open position, is held alongside the front support 20a of the frame 12a, 14a. When the stroller 10a is in the open position, the stand structure 90a can be hidden from view by various aesthetic structures, storage structures, or soft textile portions connected to the frame 12a, 14a to improve appearance of the stroller 10a. As the stroller 10a transitions from the open position to the closed position, the sliding joint 40a or key pushes the stand structure 90a in a downward direction such that, in the fully closed position, the stand structure 90a at last partially extends beyond the end of the front support 20a and front wheel 46a.

With specific reference to FIGS. 25 and 26, the stand structure 90a may include one or more bending joints, namely, a proximal bending joint 96a and a distal bending joint 98a. The bending joints 96a, 98a cause the stand structure 90a to curl upward and outward as it transitions to the closed position. The stand structure 90a is shown in the retracted position (e.g., when the stroller 10a is in the open position) in FIG. 25 and in the extended position (e.g., when the stroller 10a is in the fully closed position) in FIG. 26. Specifically, as the stand structure 90a transitions to the closed position, the proximal bending joint 96a rotates, such that distal portions of the stand structure 90a curl away from the front wheel 46a. The distal bending joint 98a rotates so that the distal end or contact surface 94a of the stand structure 90a can rest against the ground to support the stroller 10a. When the stroller 10a is in its fully closed position, the stroller 10a can be tipped forward such that it rests on at least three contact points, namely, the front right and left wheels 46a, and the contact surface 94a of the stand structures 90a. In embodiments of the stroller 90a having two stand structures 90a (e.g., a stand structure 90a extending from each of the right frame 12a and the left frame 14a) the stroller 10a can rest against four contact points for improved stability. In either case, the stroller 10a is supported in an upright orientation.

Although a collapsible stroller 10, 10a has been described in detail for the purpose of illustration, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. Further, although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A stroller comprising:
   a frame configured to transition between an open position and a closed position and comprising a right side and a left side; and
   a linkage comprising one or more substantially rigid members connected between the right side and the left side,
   wherein each of the substantially rigid members comprises a right end and a left end, and wherein the right end and the left end, respectively, are slidably connected to a portion of the right side and the left side.

2. The stroller of claim 1, wherein the linkage is a scissor linkage comprising at least a first member and a second member rotatably connected together at a pivot joint.

3. The stroller of claim 2, wherein as the frame transitions from the open position to the closed position, the members rotate at the pivot joint such that the ends of the first member move away from the ends of the second member.

4. The stroller of claim 1, further comprising a second linkage connected between the right frame and the left frame, wherein at least a portion of the second linkage is fixedly connected to the right side and another portion of the second linkage is fixedly connected to the left side.

5. The stroller of claim 1, wherein the right side of the frame and the left side of the frame each comprise a front support rotatably connected to a rear support at a frame joint, and wherein the linkage is slidably connected to the rear support of the right side and to the rear support of the left side of the frame.

6. The stroller of claim 1, wherein the right end and the left end of the linkage comprise sliders, and wherein the sliders are slidably inserted in longitudinal slots extending along at least a portion of the right side and the left side of the frame.

7. The stroller of claim 1, further comprising a drive mechanism coupled to the frame and configured to transition the frame between the open position and the closed position.

8. The stroller of claim 7, wherein the drive mechanism comprises a cable drive.

9. The stroller of claim 7, further comprising an activation button for actuating the drive mechanism to transition the stroller from the open position to the closed position or from the closed position to the open position.

10. The stroller of claim 9, wherein the activation button is a dead man switch.

11. The stroller of claim 1, wherein the right side and/or the left side of the frame comprise at least one telescoping tube, the telescoping tube comprising:
    an outer tube; and
    an inner tube slidably inserted in the outer tube, wherein the inner tube is retracted within the outer tube as the frame transitions from the open position to the closed position and is extended from the outer tube as the frame transitions from the closed position to the open position.

12. The stroller of claim 1, further comprising at least one stand structure connected to the frame and configured to maintain the stroller in a substantially upright orientation when the stroller is in the closed position.

13. The stroller of claim 12, wherein the stand structure automatically extends from the frame as the frame transitions to the closed position.

14. The stroller of claim 12, wherein the stand structure is slidably connected to the frame, such that a distal end of the stand structure slides past a bottom of the frame as the frame transitions to the closed position.

15. The stroller of claim 12, wherein the stand structure comprises one or more bending joints configured to bend in an outward direction as the stroller transitions to the closed position.

16. The stroller of claim 15, wherein the stand structure comprises a contact surface extending from a distal most bending joint to a distal end of the stand structure, the contact surface being configured to contact a substantially flat surface to assist in maintaining the stroller in the upright orientation.

17. A stroller comprising:
a frame configured to transition between an open position and a closed position; and
at least one stand structure connected to a portion of the frame and configured to automatically extend from the frame as the stroller transitions from the open position to the closed position.

18. The stroller of claim 17, wherein the stand structure comprises one or more bending joints configured to bend in an outward direction as the stroller transitions to the closed position.

19. The stroller of claim 17, wherein the stand structure comprises a contact surface extending from a distal most bending joint to a distal end of the stand structure, the contact surface being configured to contact a substantially flat surface to assist in maintaining the stroller in the upright orientation.

20. The stroller of claim 17, wherein the at least one stand structure is slidably connected to the frame, such that a distal end of the stand structure slides past a bottom of the frame as the frame transitions to the closed position.

* * * * *

UNITED STATES PATENT AND TRADEMARK OFFICE
CERTIFICATE OF CORRECTION

PATENT NO. : 9,505,423 B2  
APPLICATION NO. : 14/660342  
DATED : November 29, 2016  
INVENTOR(S) : Henry F. Thorne et al.

Page 1 of 1

It is certified that error appears in the above-identified patent and that said Letters Patent is hereby corrected as shown below:

On the Title Page

Item (72), Column 1, Line 2, delete "Lou Conley" and insert -- Louis S. Conley --

Signed and Sealed this
Twenty-eighth Day of March, 2017

Michelle K. Lee
*Director of the United States Patent and Trademark Office*